United States Patent
Katayama et al.

(10) Patent No.: US 10,374,937 B2
(45) Date of Patent: Aug. 6, 2019

(54) DOMAIN CONTROL METHOD AND DOMAIN CONTROL DEVICE

(71) Applicant: NTT DOCOMO, INC., Chiyoda-ku (JP)

(72) Inventors: Youhei Katayama, Chiyoda-ku (JP); Motoshi Tamura, Chiyoda-ku (JP); Ashiq Khan, Chiyoda-ku (JP); Takuya Shimojou, Chiyoda-ku (JP)

(73) Assignee: NTT DOCOMO, INC., Chiyoda-ku (JP)

( * ) Notice: Subject to any disclaimer, the term of this patent is extended or adjusted under 35 U.S.C. 154(b) by 236 days.

(21) Appl. No.: 15/328,933

(22) PCT Filed: Sep. 30, 2015

(86) PCT No.: PCT/JP2015/077766
§ 371 (c)(1),
(2) Date: Jan. 25, 2017

(87) PCT Pub. No.: WO2016/056445
PCT Pub. Date: Apr. 14, 2016

(65) Prior Publication Data
US 2017/0214603 A1 Jul. 27, 2017

(30) Foreign Application Priority Data
Oct. 6, 2014 (JP) ................................. 2014-205995

(51) Int. Cl.
*G06F 15/173* (2006.01)
*H04L 12/715* (2013.01)
(Continued)

(52) U.S. Cl.
CPC .............. *H04L 45/04* (2013.01); *H04L 45/42* (2013.01); *H04L 61/3005* (2013.01);
(Continued)

(58) Field of Classification Search
CPC ..... H04L 45/04; H04L 45/42; H04L 61/3005; H04L 12/4641; H04L 45/50; H04L 61/6095; H04L 69/22
(Continued)

(56) References Cited

U.S. PATENT DOCUMENTS 8,839,242 B2 * 9/2014 Nakajima ......... H04L 29/12254
709/226
8,892,706 B1 * 11/2014 Dalal .................. H04L 12/4641
709/223
(Continued)

FOREIGN PATENT DOCUMENTS

| JP | 2005-340983 A | 12/2005 |
|----|---------------|---------|
| JP | 2012-199723 A | 10/2012 |

OTHER PUBLICATIONS

Extended European Search Report dated Sep. 12, 2017 in Patent Application No. 15848507.8.
(Continued)

*Primary Examiner* — Melvin H Pollack
(74) *Attorney, Agent, or Firm* — Oblon, McClelland, Maier & Neustadt, L.L.P.

(57) ABSTRACT

An integrated control device, to implement automatic address assignment in a path spanning two or more administrative domains, and to implement communication between a plurality of administrative domains, acquires definition information that defines protocols used in each administrative domain from an inter-administrative domain communication protocol stack list table, acquires available addresses of each protocol in each administrative domain which can be used for communication between the respective administrative domains from an available address range table, acquires a communication route from a starting point administrative domain to an ending point administrative domain, specifies domains that use the respective protocols (Continued)

on the communication route by using the definition information, assigns protocol information such as available addresses of each protocol between the specified domains by using an available address range table and notifies the assigned address to each domain.

8 Claims, 32 Drawing Sheets

(51) Int. Cl.
  *H04L 12/717* (2013.01)
  *H04L 29/12* (2006.01)
  *H04L 12/46* (2006.01)
  *H04L 12/723* (2013.01)
  *H04L 29/06* (2006.01)

(52) U.S. Cl.
  CPC .......... *H04L 12/4641* (2013.01); *H04L 45/50* (2013.01); *H04L 61/6095* (2013.01); *H04L 69/22* (2013.01)

(58) Field of Classification Search
  USPC ........................................................ 709/224
  See application file for complete search history.

(56) References Cited

U.S. PATENT DOCUMENTS

| | | | |
|---|---|---|---|
| 9,374,285 B1* | 6/2016 | Ramasubramanian | H04L 41/12 |
| 9,525,647 B2* | 12/2016 | Koponen | H04L 41/0893 |
| 9,571,387 B1* | 2/2017 | Atlas | H04L 45/50 |
| 9,577,925 B1* | 2/2017 | Bahadur | H04L 45/50 |
| 9,614,748 B1* | 4/2017 | Battersby | H04N 21/41407 |
| 9,621,453 B1* | 4/2017 | Pani | H04L 45/24 |
| 9,686,127 B2* | 6/2017 | Ramachandran | H04L 63/061 |
| 9,699,034 B2* | 7/2017 | Lee | H04L 41/12 |
| 9,712,486 B2* | 7/2017 | Johnson | H04W 4/70 |
| 9,729,424 B2* | 8/2017 | Yin | H04L 45/02 |
| 9,749,214 B2* | 8/2017 | Han | H04L 45/02 |
| 9,832,102 B2* | 11/2017 | Farkas | H04L 45/22 |
| 9,898,317 B2* | 2/2018 | Nakil | G06F 9/45558 |
| 9,912,582 B2* | 3/2018 | Pourzandi | H04L 45/42 |
| 9,979,602 B1* | 5/2018 | Chinnakannan | H04L 41/12 |
| 9,992,062 B1* | 6/2018 | Hankins | H04L 12/1836 |
| 10,097,372 B2* | 10/2018 | Bhattacharya | H04L 45/745 |
| 10,110,417 B1* | 10/2018 | Hankins | H04L 41/04 |
| 2011/0320821 A1 | 12/2011 | Alkhatib et al. | |
| 2014/0196121 A1 | 7/2014 | Alkhatib et al. | |
| 2014/0229945 A1* | 8/2014 | Barkai | H04L 49/70 718/1 |
| 2014/0280846 A1* | 9/2014 | Gourlay | H04L 41/00 709/223 |
| 2015/0052258 A1* | 2/2015 | Johnson | H04L 67/141 709/228 |
| 2015/0095788 A1* | 4/2015 | Thiele | G06F 3/04817 715/735 |
| 2015/0103772 A1* | 4/2015 | Carnero Ros | H04L 45/04 370/329 |
| 2016/0080245 A1* | 3/2016 | Fang | H04L 45/745 370/392 |

OTHER PUBLICATIONS

International Preliminary Report on Patentability and Written Opinion dated Apr. 20, 2017 in PCT/JP2015/077766.
International Search Report dated Dec. 1, 2015 in PCT/JP2015/077766 field Sep. 30, 2015.

* cited by examiner

*Fig.3*

| ADMINISTRATIVE DOMAIN CONNECTION INFORMATION |
| --- |
| ADMINISTRATIVE DOMAIN A, ADMINISTRATIVE DOMAIN C |
| ADMINISTRATIVE DOMAIN C, ADMINISTRATIVE DOMAIN E |
| ADMINISTRATIVE DOMAIN E, ADMINISTRATIVE DOMAIN D |
| ADMINISTRATIVE DOMAIN D, ADMINISTRATIVE DOMAIN B |

| VIRTUAL PATH IDENTIFIER | VIA-ADMINISTRATIVE DOMAINS SEQUENCE LIST |
|---|---|
| VIRTUAL PATH 1 | {ADMINISTRATIVE DOMAIN A, ADMINISTRATIVE DOMAIN C, ADMINISTRATIVE DOMAIN E, ADMINISTRATIVE DOMAIN D, ADMINISTRATIVE DOMAIN B} |
| ... | |

Fig. 5

| STACK GROUP IDENTIFIER | ADMINISTRATIVE DOMAIN IDENTIFIER | VIRTUAL PATH ENDPOINT TYPE | PROTOCOL STACK LIST | | |
|---|---|---|---|---|---|
| | | | REMOVAL PROTOCOL | TRANSFER PROTOCOL | INSERTION PROTOCOL |
| STACK 1 | ADMINISTRATIVE DOMAIN A | ENDPOINT | {VLAN, IP, VXLAN, IP2} | {} | {VLAN, IP, VXLAN, IP2} |
| STACK 1 | ADMINISTRATIVE DOMAIN C | RELAY POINT | {} | {VLAN} | {} |
| STACK 1 | ADMINISTRATIVE DOMAIN E | RELAY POINT | {VLAN} | {IP} | {VLAN} |
| STACK 1 | ADMINISTRATIVE DOMAIN D | RELAY POINT | {} | {VLAN} | {} |
| STACK 1 | ADMINISTRATIVE DOMAIN B | ENDPOINT | {VLAN, IP, VXLAN, IP2} | {} | {VLAN, IP, VXLAN, IP2} |
| ... | | | | | |
| STACK 2 | ADMINISTRATIVE DOMAIN A | ENDPOINT | {VLAN, IP, VXLAN} | {} | {VLAN, IP, VXLAN, IP2} |
| STACK 2 | ADMINISTRATIVE DOMAIN A | RELAY POINT | {VLAN, IP, VXLAN} | {IP2} | {} |
| STACK 2 | ADMINISTRATIVE DOMAIN F | ENDPOINT | {IP2} | {} | {IP2} |
| ... | | | | | |

Fig.6

| ADMINISTRATIVE DOMAIN IDENTIFIER | AVAILABLE ADDRESS RANGE |
|---|---|
| ADMINISTRATIVE DOMAIN A | {VLAN: 100-199}, {IP: 192.168.10.1-192.168.10.254}, {VXLAN: 10000-19999}, {IP2: 192.168.0.1-192.168.0.254} |
| ADMINISTRATIVE DOMAIN C | {VLAN: 100-199} |
| ADMINISTRATIVE DOMAIN E | {VLAN: 100-299}, {IP: 192.168.10.1-192.168.10.254} |
| ... | |

Fig. 7

| ADMINISTRATIVE DOMAIN IDENTIFIER | TYPE | SELECTED ADDRESS |
|---|---|---|
| ADMINISTRATIVE DOMAIN A | INSERTION | {VLAN: 100} |
| ADMINISTRATIVE DOMAIN C | TRANSFER | {VLAN: 100} |
| ADMINISTRATIVE DOMAIN E | REMOVAL | {VLAN: 100} |
| ADMINISTRATIVE DOMAIN E | INSERTION | {VLAN: 200} |
| ADMINISTRATIVE DOMAIN D | TRANSFER | {VLAN: 200} |
| ADMINISTRATIVE DOMAIN B | REMOVAL | {VLAN: 200} |
| ADMINISTRATIVE DOMAIN A | INSERTION | {IP: 192.168.10.1} |
| ADMINISTRATIVE DOMAIN E | TRANSFER | {IP: 192.168.10.1} |
| ADMINISTRATIVE DOMAIN C | REMOVAL | {IP: 192.168.10.1} |
| ... | | |

Fig. 8

| ADMINISTRATIVE DOMAIN IDENTIFIER | VIRTUAL PATH GROUP IDENTIFIER | VIRTUAL PATH IDENTIFIER | USED ADDRESS SET |
|---|---|---|---|
| ADMINISTRATIVE DOMAIN A | VIRTUAL PATH G1 | VIRTUAL PATH 1 | {VLAN: 100, IP: 192.168.10.1, VXLAN: 10000, IP2: 192.168.0.1} |
| ADMINISTRATIVE DOMAIN A | VIRTUAL PATH G1 | VIRTUAL PATH 2 | {VLAN: 100, IP: 192.168.10.1, VXLAN: 10000, IP2: 192.168.0.1} |
| ADMINISTRATIVE DOMAIN B | VIRTUAL PATH G1 | VIRTUAL PATH 1 | {VLAN: 200, IP: 192.168.10.2, VXLAN: 10000, IP2: 192.168.0.2} |
| ... | | | |

*Fig.9*

| VIRTUAL PATH IDENTIFIER | ADDRESS SELECTION STATUS |
|---|---|
| VIRTUAL PATH 1 | COMPLETION |
| VIRTUAL PATH 2 | COMPLETION |
| VIRTUAL PATH 3 | COMPLETION |
| VIRTUAL PATH 4 | NON-COMPLETION |

Fig.13

| DEVICE CONNECTION INFORMATION |
|---|
| RELAY DEVICE C, RELAY DEVICE D |
| RELAY DEVICE D, RELAY DEVICE E |

| VIRTUAL PATH IDENTIFIER | VIA-DEVICES SEQUENCE LIST |
|---|---|
| VIRTUAL PATH 1 | {RELAY DEVICE C, RELAY DEVICE D, RELAY DEVICE E} |
| ... | |

Fig. 15

| DEVICE IDENTIFIER | PROTOCOL STACK LIST | | |
|---|---|---|---|
| | REMOVAL PROTOCOL | TRANSFER PROTOCOL | INSERTION PROTOCOL |
| RELAY DEVICE C | {} | {VLAN} | {MPLS} |
| RELAY DEVICE D | {MPLS} | {} | {MPLS} |
| RELAY DEVICE E | {MPLS} | {VLAN} | {} |

Fig. 16

| DEVICE IDENTIFIER | REQUEST SOURCE INTEGRATED CONTROL DEVICE | AVAILABLE ADDRESS RANGE |
|---|---|---|
| RELAY DEVICE C | INTEGRATED CONTROL DEVICE A | {VLAN: 100-3999}, {MPLS: 16-1000000} |
| RELAY DEVICE D | INTEGRATED CONTROL DEVICE A | {MPLS: 16-1000000} |
| RELAY DEVICE E | INTEGRATED CONTROL DEVICE A | {VLAN: 100-3999}, {MPLS: 16-1000000} |
| ... | | |

*Fig.17*

| REQUEST SOURCE INTEGRATED CONTROL DEVICE | VIRTUAL PATH GROUP IDENTIFIER | VIRTUAL PATH IDENTIFIER | DEVICE IDENTIFIER | USED ADDRESS SET |
|---|---|---|---|---|
| INTEGRATED CONTROL DEVICE A | VIRTUAL PATH G1 | VIRTUAL PATH 1 | RELAY DEVICE C | Pop {}, Forward: {VLAN: 100}, Push: {MPLS: 100} |
| INTEGRATED CONTROL DEVICE A | VIRTUAL PATH G1 | VIRTUAL PATH 1 | RELAY DEVICE D | Pop {MPLS: 100}, Forward: {}, Push: {MPLS: 101} |
| INTEGRATED CONTROL DEVICE A | VIRTUAL PATH G1 | VIRTUAL PATH 1 | RELAY DEVICE E | Pop {MPLS: 101}, Forward: {VLAN: 100}, Push: {} |
| ... | | | | ... |

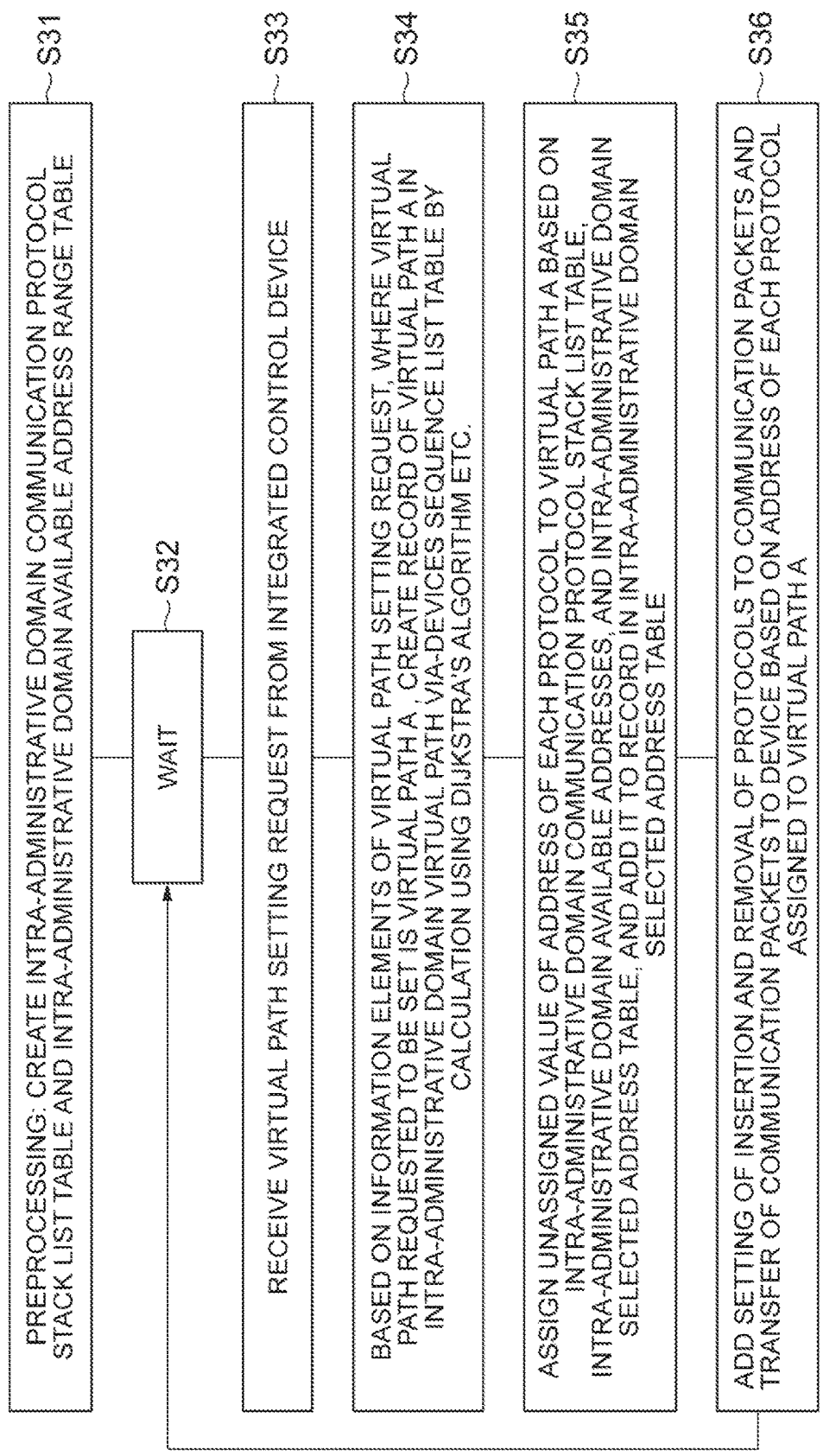

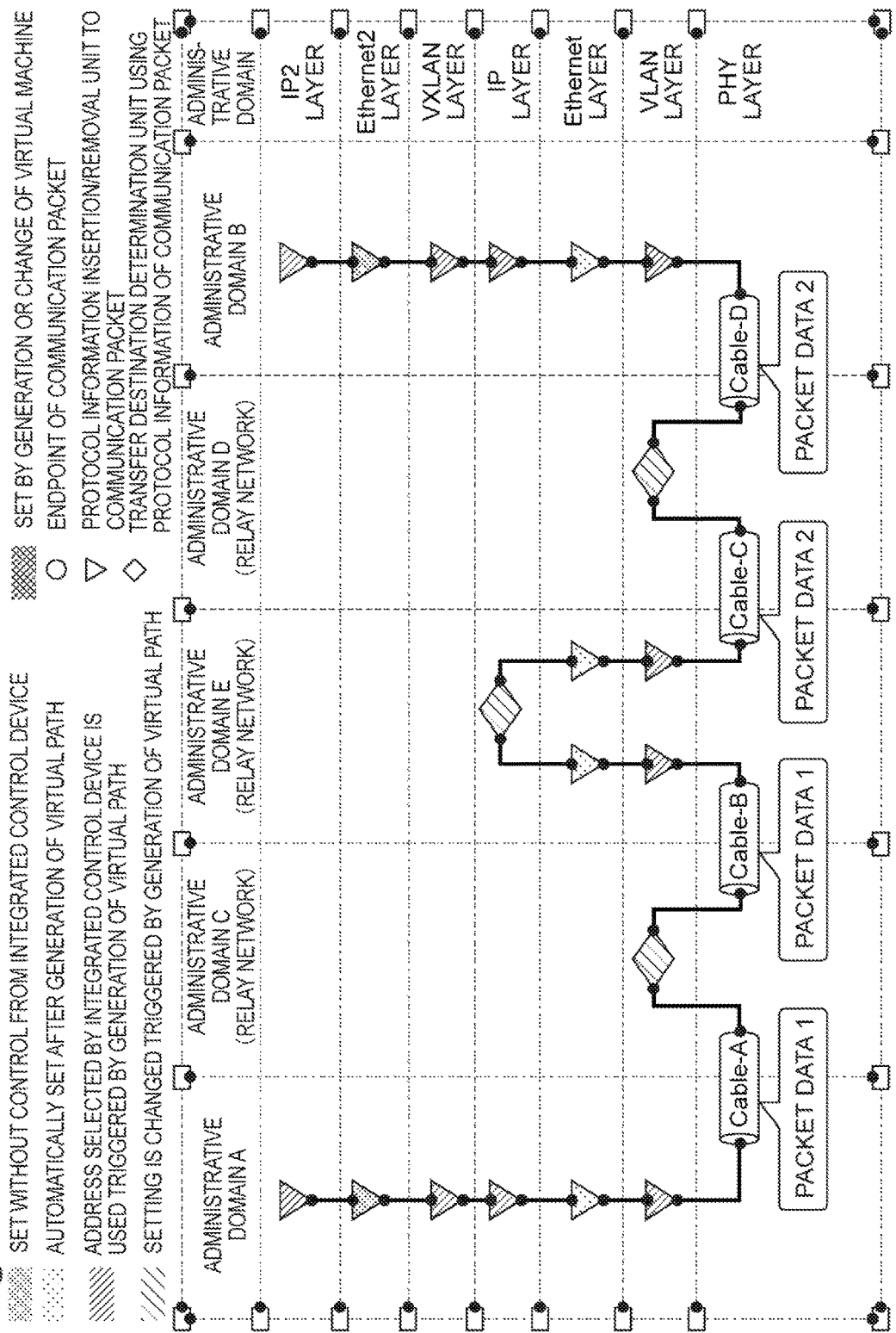

Fig. 20

(A) PACKET DATA 1: COMMUNICATION IN DIRECTION OF ADMINISTRATIVE DOMAIN A → B

| Ethernet LAYER | | VLAN LAYER | IP LAYER | | VXLAN LAYER | Ethernet2 LAYER | | IP2 LAYER | | |
|---|---|---|---|---|---|---|---|---|---|---|
| TRANSMISSION SOURCE | DESTINATION | TAG | TRANSMISSION SOURCE | DESTINATION | ID | TRANSMISSION SOURCE | DESTINATION | TRANSMISSION SOURCE | DESTINATION | |
| MAC ADDRESS 2 OF NIC OF RELAY DEVICE F | MAC ADDRESS 1 OF NIC OF PROCESSING DEVICE B | 100 | 192.168.10.1 | 192.168.10.2 | 10000 | MAC ADDRESS 1 OF VIRTUAL NIC OF PROCESSING DEVICE A | MAC ADDRESS 1 OF VIRTUAL NIC OF PROCESSING DEVICE B | 192.168.0.1 | 192.168.0.2 | payload |

AUTOMATICALLY SOLVED BY ARP (Ethernet LAYER)
AUTOMATICALLY SOLVED BY ARP (Ethernet2 LAYER)

(B) PACKET DATA 2: COMMUNICATION IN DIRECTION OF ADMINISTRATIVE DOMAIN A → B

| Ethernet LAYER | | VLAN LAYER | IP LAYER | | VXLAN LAYER | Ethernet2 LAYER | | IP2 LAYER | | |
|---|---|---|---|---|---|---|---|---|---|---|
| TRANSMISSION SOURCE | DESTINATION | TAG | TRANSMISSION SOURCE | DESTINATION | ID | TRANSMISSION SOURCE | DESTINATION | TRANSMISSION SOURCE | DESTINATION | |
| MAC ADDRESS 2 OF NIC OF RELAY DEVICE F | MAC ADDRESS 1 OF NIC OF PROCESSING DEVICE B | 200 | 192.168.10.1 | 192.168.10.2 | 10000 | MAC ADDRESS 1 OF VIRTUAL NIC OF PROCESSING DEVICE A | MAC ADDRESS 1 OF VIRTUAL NIC OF PROCESSING DEVICE B | 192.168.0.1 | 192.168.0.2 | payload |

AUTOMATICALLY SOLVED BY ARP (Ethernet LAYER)
AUTOMATICALLY SOLVED BY ARP (Ethernet2 LAYER)

Fig.22

| Ethernet LAYER | | VLAN LAYER | MPLS LAYER | IP LAYER | | VXLAN LAYER | Ethernet2 LAYER | | IP2 LAYER | | payload |
|---|---|---|---|---|---|---|---|---|---|---|---|
| TRANS-MISSION SOURCE | DESTINA-TION | TAG | LABEL | TRANS-MISSION SOURCE | DESTINA-TION | ID | TRANS-MISSION SOURCE | DESTINA-TION | TRANS-MISSION SOURCE | DESTINA-TION | |

Fig.26

| STACK GROUP IDENTIFIER | ADMINISTRATIVE DOMAIN IDENTIFIER | VIRTUAL PATH ENDPOINT TYPE | PROTOCOL STACK LIST | | |
|---|---|---|---|---|---|
| | | | REMOVAL PROTOCOL | TRANSFER PROTOCOL | INSERTION PROTOCOL |
| STACK 3 | ADMINISTRATIVE DOMAIN A | ENDPOINT | {IP, VXLAN, VLAN2, IP2} | {} | {IP, VXLAN, VLAN2, IP2} |
| STACK 3 | ADMINISTRATIVE DOMAIN C | RELAY POINT | {} | {IP} | {} |
| STACK 3 | ADMINISTRATIVE DOMAIN E | RELAY POINT | {} | {IP} | {} |
| STACK 3 | ADMINISTRATIVE DOMAIN D | RELAY POINT | {} | {IP} | {} |
| STACK 3 | ADMINISTRATIVE DOMAIN B | ENDPOINT | {IP, VXLAN, VLAN2, IP2} | {} | {IP, VXLAN, VLAN2, IP2} |
| ... | | | | | |

DOMAIN CONTROL METHOD AND DOMAIN CONTROL DEVICE

TECHNICAL FIELD

The present invention relates to a domain control method and a domain control device.

BACKGROUND ART

In order to reduce the operating cost of a network system of a business operator, a technique called NFV (Network Functions Virtualization) that implements some of network functions, which have been implemented by using a dedicated device, by using a virtual machine of a general-purpose server device is used.

A technique that controls a virtual machine of a general-purpose server device is implemented as a network system control device and a network system control scheme for a data center cloud, and this is applied to a network system control device and a network system control scheme for NFV.

The connection between virtual machines is made by setting a virtual link called a path in a relay device on a route that connects between the virtual machines. The path is uniquely recognized by combination of various protocol addresses in order to avoid interference of communication between paths.

Generally, a network system of a business operator includes administrative domains that are separated by areas or roles and is constructed and managed for each administrative domain. In each administrative domain, a point control device, which is a device that manages and controls devices in the administrative domain, is located. Further, there is a case where a network system of a business operator uses a plurality of administrative domain devices in order to provide a service using the network system, and in this case, an integrated control device, which is a network system control device that integrates and manages a plurality of point control devices in order for device control to provide services, is located. Note that the integrated control device may manage a point control device that is located in a network system of another network operator or a data center operator.

As a specific method to construct a network, there is a technique that, based on the assumption that devices constituting a network are connected in a hierarchy, allocates available addresses to terminal devices based on topology information containing hierarchy information (for example, see Patent Literature 1).

CITATION LIST

Patent Literature

PTL1: Japanese Unexamined Patent Publication No. 2005-340983

SUMMARY OF INVENTION

Technical Problem

According to the invention disclosed in Patent Literature 1, an upper-level relay device is selected, and when a device is added, one of available addresses held by the upper-level relay device is assigned to a lower-level relay device or a terminal device. Therefore, the invention disclosed in Patent Literature 1 cannot be used for an application that allocates an address which can be used in common to a plurality of administrative domains that are constructed and managed separately. Because a network system of a business operator typically has a configuration where devices communicate with each other spanning two or more administrative domains, such as where a plurality of administrative domains where a general-purpose server device that performs call processing is located are connected directly or through an administrative domain for relaying, it is preferred that automatic addressing is done also when devices communicate with each other spanning two or more administrative domains.

The present invention has been accomplished to solve the above problems and an object of the present invention is thus to provide a domain control method and a domain control device that automatically assign addresses in a path which spans two or more administrative domains.

Solution to Problem

A domain control method according to the present invention is a domain control method performed in a domain control device that assigns an address to be used between one administrative domain and another administrative domain on a communication route from a starting point administrative domain at a starting point of communication to an ending point administrative domain at an ending point of communication among a plurality of administrative domains, each administrative domain being a device group composed of one or more devices possibly including a virtual server and controlled by a control device of a network system, where available addresses are set for each protocol used for communication between an administrative domain and another administrative domain, the method including a first step of specifying the one administrative domain and another administrative domain on the communication route by using information concerning protocols used for communication between the one administrative domain and another administrative domain, a second step of acquiring the available addresses set for each protocol in the one administrative domain and another administrative domain specified by the first step, and a third step of assigning an address usable in common to one administrative domain and another administrative domain among the available addresses acquired by the second step.

A domain control device according to the present invention is a domain control device that assigns an address to be used between one administrative domain and another administrative domain on a communication route from a starting point administrative domain at a starting point of communication to an ending point administrative domain at an ending point of communication among a plurality of administrative domains, each administrative domain being a device group composed of one or more devices possibly including a virtual server and controlled by a control device of a network system, where available addresses are set for each protocol used for communication between an administrative domain and another administrative domain, and one or a plurality of circuits specify the one administrative domain and another administrative domain on the communication route by using information concerning protocols used for communication between the one administrative domain and another administrative domain, acquire the available addresses set for each protocol in the specified one administrative domain and another administrative domain, and assign an address usable in common to one administrative domain and another administrative domain among the acquired available addresses.

According to the present invention, because protocol layers are defined, and an address that can be used in common to the respective protocol layers on a communication route is determined, it is possible to automatically determine an address that is used between the domains on the communication route.

The above-describe domain control method may further include a fourth step of notifying one administrative domain and another administrative domain of the address assigned by the third step. In this case, it is possible to notify an address that is used between one administrative domain and another administrative domain.

In the above-describe domain control method, as information concerning protocols used for communication between the one administrative domain and another administrative domain, definition information that defines a protocol to be inserted to a packet, a protocol to be removed from a packet or a protocol to be used for transferring a packet in each administrative domain may be acquired. In this case, because the domain control device determines an address between domains that are common in insertion, transfer and removal of a packet, it is possible to automatically determine an address that is used between the domains on the communication route.

In the above-describe domain control method, the first step may specify target domains in a sequence of a communication route on the basis of protocols to specify target domains by using any one or all of definition of a domain to insert protocol information of each protocol in the information concerning protocols to a packet, definition of a domain to remove the protocol information from a packet and definition of a domain to use the protocol information for transferring a packet, and the communication route. In this case, because target domains are specified in a sequence of a communication route after specifying protocols to be inserted in definition information, it is possible to reliably specify domains for insertion, transfer and removal.

In the above-describe domain control method, the domain control device may store the available addresses, and the second step may acquire an available address for one administrative domain and another administrative domain from the stored available addresses. In this case, because the domain control device stores available addresses in advance and acquires the stored addresses, it is possible to reliably acquire available addresses.

In the above-describe domain control method, the second step may further acquire fixed address information, and the third step may assign an address by further using the fixed address information acquired by the second step. In this case, because the domain control method acquires the fixed address information and assigns an address based on the fixed address information, it is possible to perform assignment in consideration of a device where the available range is already fixed.

In the above-describe domain control method, the third step may eliminate an assigned address from available addresses. In this case, because the domain control method eliminates an assigned address from available addresses, it is possible to prevent assignment of an address that has been already assigned.

In the above-describe domain control method, the second step may transmit information of the stored available addresses to an external device and acquire available address information narrowed down based on the transmitted information from the external device. In this manner, because available address information that is narrowed down based on the transmitted information is acquired when acquiring available addresses from an external device, it is possible to reduce the communication load with the external device.

Advantageous Effects of Invention

According to the present invention, it is possible to automatically assign addresses in a path which spans two or more administrative domains.

BRIEF DESCRIPTION OF DRAWINGS

FIG. 3 is a view showing one example of information stored in a domain connection table 121.

FIG. 4 is a view showing one example of information stored in a virtual path via-administrative domains sequence list table 122.

FIG. 5 is a view showing one example of information stored in an inter-administrative domain communication protocol stack list table 123.

FIG. 6 is a view showing one example of information stored in an available address range table 124.

FIG. 7 is a view showing one example of information stored in a temporarily selected address table 125.

FIG. 8 is a view showing one example of information stored in a selected address table 126.

FIG. 9 is a view showing one example of information stored in a virtual path setting status management table 127.

FIG. 13 is a view showing one example of information stored in a device connection table 171.

FIG. 14 is a view showing one example of information stored in an intra-administrative domain virtual path via-devices sequence list table 172.

FIG. 15 is a view showing one example of information stored in an intra-administrative domain communication protocol stack list table 173.

FIG. 16 is a view showing one example of information stored in an available address range table 174.

FIG. 17 is a view showing one example of information stored in an intra-administrative domain selected address table 175.

FIG. 18 is a flowchart of an address setting process performed in the point control device 150.

FIG. 19 is a view showing a packet data transmission and reception state between domains.

FIG. 20 is a view showing a data structure transmitted and received between domains.

FIG. 22 is a view showing a data structure transmitted and received between devices.

FIG. 26 is a view showing one example of information stored in an inter-administrative domain communication protocol stack list table 123 according to the third embodiment.

DESCRIPTION OF EMBODIMENTS

An embodiment is described hereinafter with reference to the drawings. Note that, where possible, the same elements are denoted by the same reference symbols and redundant description thereof is omitted.

Figure 1:
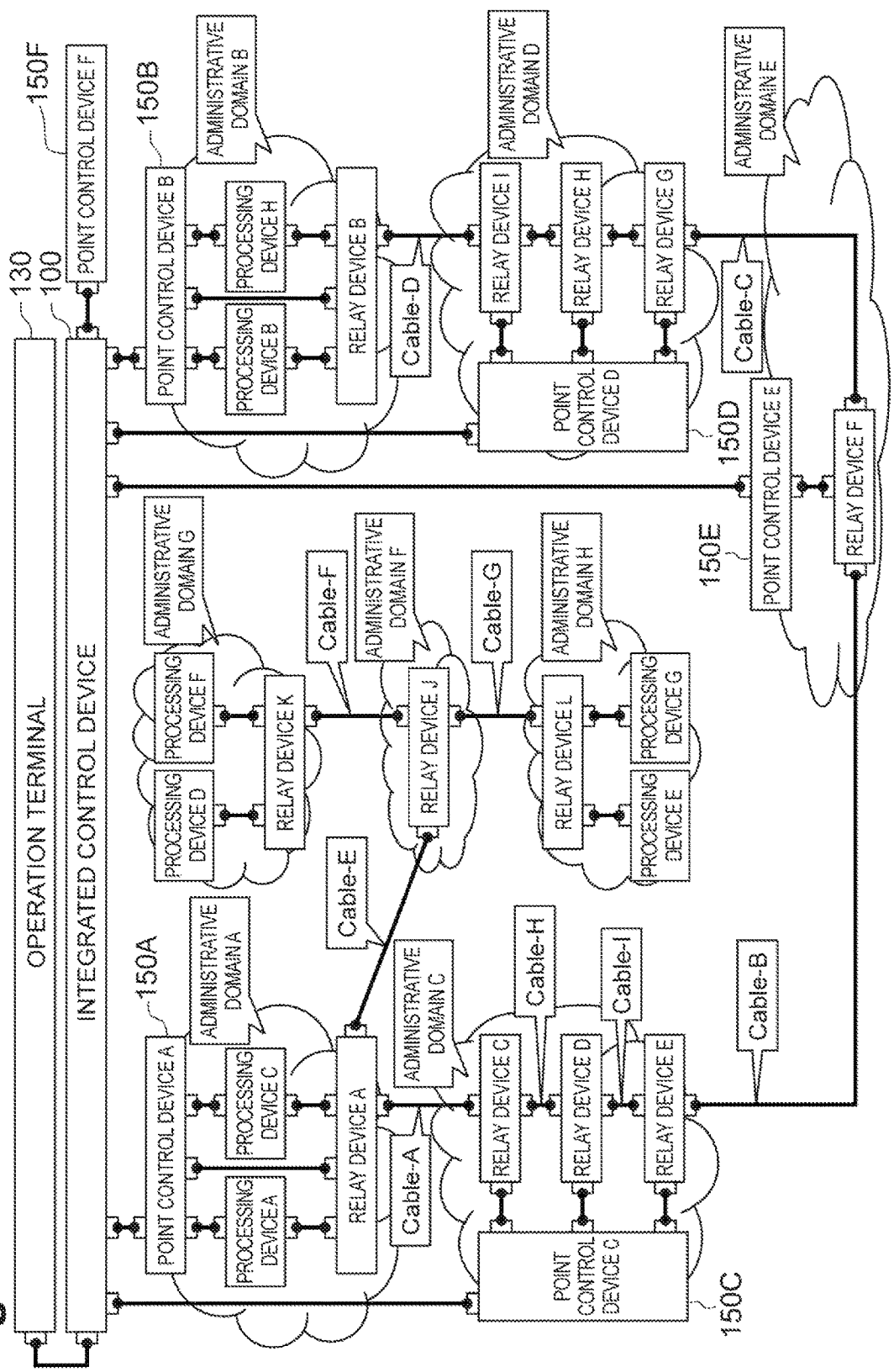
FIG. 1 is a system configuration diagram of a communication system that includes an integrated control device 100 according to a first embodiment.

FIG. 1 is a block diagram showing a communication system that is composed of an integrated control device 100 that functions as a domain control device according to this embodiment, a point control device 150 that manages each domain, and an operation terminal 130 that makes an operation request to the integrated control device 100.

The integrated control device 100 receives a domain at a starting point of a virtual path (starting point administrative domain) and a domain at an ending point of a virtual path (ending point administrative domain) from the operation terminal 130, and then searches for a path from the starting point domain to the ending point domain, and sets an address between the domains in the searched path.

Further, the integrated control device 100 is a device that manages each administrative domain and, specifically, it is a server device or the like.

An administrative domain (administrative domain A, administrative domain B etc.) manages a virtual server. A point control device such as the point control device 150A manages a processing device and a relay device in each administrative domain. The point control device 150 notifies the integrated control device 100 of available addresses in the administrative domain at specified timing.

A processing device in an administrative domain is an information processing device that executes VMM (Virtual Machine Monitor) called hypervisor or the like and activates VM (Virtual Machine), for example.

A relay device in an administrative domain is a relay device such as a switch that receives a packet and transfers the received packet according to the destination of a packet.

An administrative domain A, an administrative domain C, an administrative domain E, an administrative domain D, and an administrative domain B include a point control device 150, and the point control device 150 notifies the integrated control device 100 of address range information, and the integrated control device 100 searches for a virtual path from a certain administrative domain to a certain administrative domain, and performs addressing based on the virtual path by referring to the address range information.

Note that an administrative domain F, an administrative domain G and an administrative domain H are administrative domains to which addressing is not done triggered by control from the integrated control device 100. Available addresses are fixed to the administrative domain F, the administrative domain G and the administrative domain H.

The functions of the integrated control device 100 are described hereinafter with reference to the block diagram showing the overall configuration of the integrated control device 100 in FIG. 2. The integrated control device 100 includes a terminal request receiving unit 101, a domain route search unit 102 (communication route acquisition means), an inter-administrative domain communication protocol stack list extraction unit 103 (definition information acquisition means), an available address extraction unit 104 (available address acquisition means), a target domain specifying unit 105 (target domain specifying means), an assignment unit 106 (assignment means), a notification unit 107 (notification means), and a storage unit 120.

Further, the storage unit 120 includes a domain connection table 121, a virtual path via-administrative domains sequence list table 122, an inter-administrative domain communication protocol stack list table 123, an available address range table 124 (available address information storage means), a temporarily selected address table 125, a selected address table 126, and a virtual path setting status management table 127.

The terminal request receiving unit 101 receives, from the operation terminal 130, topology information of a virtual path (information about an administrative domain (administrative domain identifier) at a starting point and an administrative domain (administrative domain identifier) at an ending point). The terminal request receiving unit 101 transmits the received topology information to the domain route search unit 102.

The domain route search unit 102 receives the topology information from the terminal request receiving unit 101 and then refers to information of the domain connection table 121 in the storage unit 120, and searches for a route (communication route) from the starting point administrative domain to the ending point administrative domain by using a known route search technique (for example, Dijkstra's algorithm). Further, the domain route search unit 102 may receive resource information from each domain and search for a route by using the resource information as a cost.

An example of the domain connection table 121 is described hereinafter with reference to FIG. 3. The domain connection table 121 has information of administrative domains that are adjacent to each other. The example of FIG. 3 shows that an administrative domain A and an administrative domain C are connected, and the administrative domain C and an administrative domain E are connected. Note that cable information that connects between those administrative domains may be further added.

The domain route search unit 102 searches for a route by referring to the above-described domain connection table 121, and then registers a result of route search in the virtual path via administrative domains sequence list table 122. Specifically, the domain route search unit 102 registers, as a result of route search, sequence information from the starting point administrative domain to the ending point administrative domain and an identifier of the sequence information in the virtual path via-administrative domains sequence list table 122.

FIG. 4 shows an example of the virtual path via-administrative domains sequence list table 122. As shown in FIG. 4, in the sequence list of administrative domains via a virtual path, "via-administrative domains sequence list", which is information indicating the sequence of administrative domains indicating a virtual path, and a virtual path identifier, which is an identifier of the virtual path, are stored in association with each other. The domain route search unit 102 notifies the inter-administrative domain communication protocol stack list extraction unit 103 of a result of route search (sequence information from the starting point administrative domain to the ending point administrative domain). Although the above-described via-administrative domains sequence list has sequence information from the starting point administrative domain to the ending point administrative domain, it may further have cable information that connects between those administrative domains.

The inter-administrative domain communication protocol stack list extraction unit 103 receives a result of route search from the domain route search unit 102, and extracts a record corresponding to the sequence from the inter-administrative domain communication protocol stack list table 123. Note that the inter-administrative domain communication protocol stack list table 123 is information collected from an external device (for example, the point control device 150).

FIG. 5 shows an example of information stored in the inter-administrative domain communication protocol stack list table 123. As shown in FIG. 5, the inter-administrative domain communication protocol stack list table 123 contains a stack group identifier, an administrative domain identifier, a virtual path endpoint type, and a protocol stack list. The protocol stack list contains a removal protocol, a transfer protocol, and an insertion protocol.

The stack group identifier is an identifier that is assigned to a route sequence of administrative domains that has been searched, assuming a virtual path. For example, in the example of FIG. 5, a stack 1 is assigned as the stack group identifier to a sequence route of the administrative domain A, the administrative domain C, the administrative domain E, the administrative domain D and the administrative domain B, and a stack 2 is assigned as the stack group identifier to a sequence route of the administrative domain A and the administrative domain F.

The administrative domain identifier is an identifier that is unique to each administrative domain, which is held by the administrative domain. The virtual path endpoint type is information indicating whether it is an endpoint or a relay point of a virtual path. The example of FIG. 5 shows that, in the virtual path with the stack group identifier of the stack 1, the administrative domain A and the administrative domain B are endpoints, and the administrative domain C, the administrative domain E and the administrative domain D are relay points.

The protocol stack list defines the removal protocol, the transfer protocol, and the insertion protocol, which are a protocol to be removed, a protocol to be transferred and a protocol to be inserted in each domain, respectively. The removal protocol is a protocol whose address is deleted in the corresponding domain, the transfer protocol is a protocol which is transferred based on an address in the corresponding domain, and the insertion protocol is a protocol whose address is inserted in the corresponding domain. For example, in the administrative domain A with the stack group identifier of the stack 1, protocols to be removed are VLAN, IP, VXLAN and IP2, there is no protocol to be transferred, and protocols to be inserted are VLAN, IP, VXLAN and IP2.

The inter-administrative domain communication protocol stack list extraction unit 103 searches for a stack group identifier in the sequence of the administrative domain A, the administrative domain C, the administrative domain E, the administrative domain D and the administrative domain B. In the case of the example shown in FIG. 5, because the administrative domain identifiers whose stack group identifier is the stack 1 are the administrative domain A, the administrative domain C, the administrative domain E, the administrative domain D and the administrative domain B, each record of the stack 1 is extracted.

In this manner, the inter-administrative domain communication protocol stack list extraction unit 103 acquires definition information that defines protocols to be inserted, transferred and removed in each administrative domain.

The inter-administrative domain communication protocol stack list extraction unit 103 sends the records with the stack group identifier of the stack 1 to the target domain specifying unit 105. Further, the inter-administrative domain communication protocol stack list extraction unit 103 notifies the available address extraction unit 104 of the administrative domain identifiers with the stack group identifier of the stack 1.

The available address extraction unit 104 receives domains corresponding to the virtual path from the inter-administrative domain communication protocol stack list extraction unit 103, and extracts the address range of the administrative domains.

Specifically, the available address extraction unit 104 acquires the address range of the domains corresponding to the virtual path from the available address range table 124. FIG. 6 shows an example of the available address range table 124. As shown in FIG. 6, in the available address range table 124, an administrative domain identifier and an available address range are associated with each other. The example of FIG. 6 shows that, for the administrative domain A, available addresses in VLAN are 100 to 199, available addresses in IP are "192.168.10,1" to "192. 168.10.254", available addresses in VXLAN are 10000 to 19999, and available addresses in IP2 are "192.168.0.1" to "192.168.0.254". In this way, the available address range table 124 stores the available address range (available address information).

The available address extraction unit 104 acquires the address range of the domains corresponding to the virtual path from the available address range table 124 and then transmits the address range of the domains corresponding to the virtual path to the assignment unit 106.

The target domain specifying unit 105 is a part that specifies domains where protocols are to be inserted, transferred or removed on the communication route acquired by the domain route search unit 102 by using the records of the inter-administrative domain communication protocol stack list table acquired by the inter-administrative domain communication protocol stack list extraction unit 103.

Specifically, the target domain specifying unit 105 specifies the insertion protocol from the record of the starting point domain (one administrative domain) among the records of the inter-administrative domain communication protocol stack list acquired by the inter-administrative domain communication protocol stack list extraction unit 103, specifies a domain (another administrative domain) of a record of the removal protocol among the subsequent records, and further specifies a domain to transfer this protocol among the insertion protocol and the removal protocol. In this way, the target domain specifying unit 105 specifies the insertion protocol, the removal protocol and the transfer protocol.

The assignment unit 106 is a part that assigns available addresses for protocols between the domains specified by the target domain specifying unit 105 by using the available addresses acquired by the available address extraction unit 104.

Specifically, the assignment unit 106 assigns an address that is common to the respective domains of the insertion protocol, the transfer protocol and the removal protocol (which is an address in the available range that overlaps between the domains).

After the assignment unit 106 assigns a common address to the protocols, it registers the result in the temporarily selected address table 125. FIG. 7 shows an example of the temporarily selected address table 125.

FIG. 7 shows the temporarily selected address table 125. The temporarily selected address table 125 has an administrative domain identifier, a protocol type (insertion, transfer, removal), and a selected address. The example of FIG. 7 shows that an address 100 is assigned to VLAN of the administrative domains A, C and E.

After assignment of protocols is done for all domains, the assignment unit 106 refers to the temporarily selected address table 125 and registers an address set (a set of addresses of each protocol) in the selected address table 126 for each administrative domain and virtual path identifier. FIG. 8 shows an example of the selected address table 126. As shown in FIG. 8, the selected address table 126 has an administrative domain identifier, a virtual path group identifier, a virtual path identifier, and a used address set. Note that the virtual path group identifier is an identifier that is common to one virtual path and a return path of this virtual path (for example, a path in an opposite sequence).

After the assignment unit 106 sets the used address set of the virtual path to the selected address table 126, it registers information indicating the completion of setting of the virtual path in the virtual path setting status management table 127. FIG. 9 shows the virtual path setting status management table 127. The virtual path setting status management table 127 has a virtual path identifier and an address selection status. When the domain route search unit 102 searches for a route of a virtual path, it generates an identifier of this virtual path, and registers the virtual path identifier generated by the domain route search unit 102 as a virtual path identifier of the virtual path setting status management table 127. In this step, the address selection status is set to "non-completion".

After the assignment unit 106 sets the used address set of the virtual path to the selected address table 126, it further registers "completion" as the address selection status of the virtual path setting status management table 127. Then, the assignment unit 106 removes the address that is assigned to each domain in the available address range table 124.

The notification unit 107 refers to the virtual path setting status management table 127 at specified timing, and requests each domain to register the address set of the virtual path identifier where the address selection status is "completion". Specifically, the notification unit 107 notifies each domain of the address assigned by the assignment unit 106.

Figure 10:
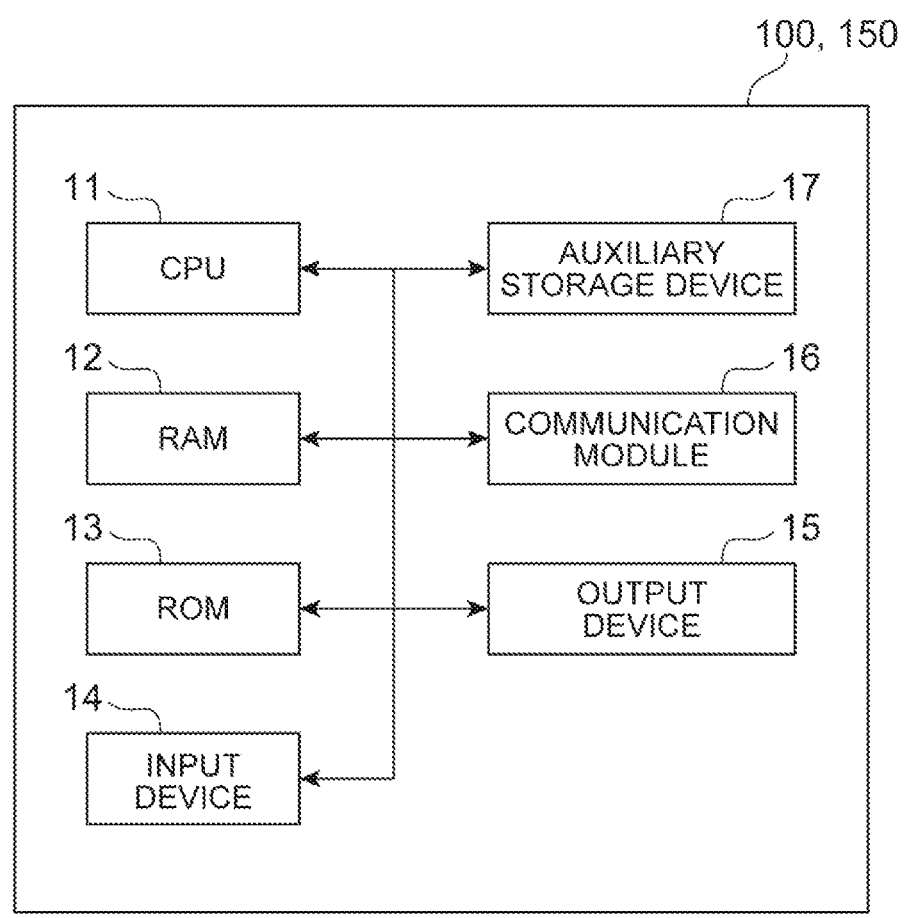
FIG. 10 is a hardware configuration diagram of an integrated control device 100, 150.

FIG. 10 is a block diagram showing the hardware configuration of the integrated control device 100 and the point control device 150. As shown in FIG. 10, the device is configured as a computer system that includes one or a plurality of CPU 11, a RAM 12 and a ROM 13 which are a main storage device, an input device 14, an output device 15, a communication module 16 which is a data transmitting and receiving device such as a network card, and an auxiliary storage device 17 such as a hard disk drive and a semiconductor memory. Those elements operate by a program or the like, and thereby the functions of the integrated control device 100, which is described above, and the point control device 150, which is described later, are implemented.

Figure 11:
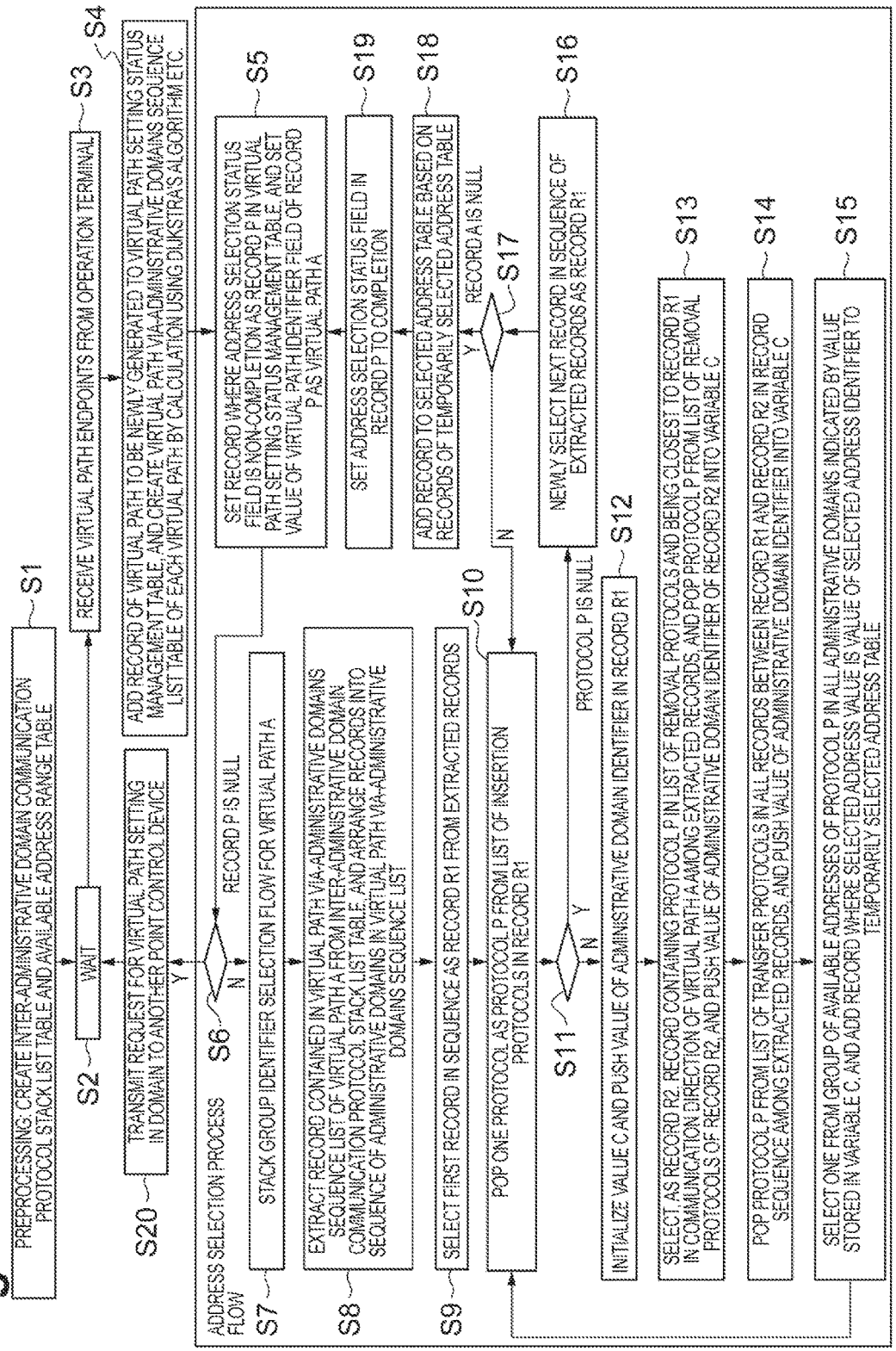
FIG. 11 is a flowchart of an address assignment process performed in the integrated control device 100.

The operation of the communication system according to this embodiment is described hereinafter with reference to the flowchart of FIG. 11. The flowchart of in FIG. 11 shows a process of receiving topology (a starting point domain and an ending point domain) of a virtual path and assigning addresses from the starting point domain to the ending point domain.

First, the virtual path via-administrative domains sequence list table 122 and the inter-administrative domain communication protocol stack list table 123 are stored in advance (Step S1), and the integrated control device 100 waits to receive the topology of a virtual path from the operation terminal 130 (Step S2).

Then, the terminal request receiving unit 101 receives topology (a starting point domain and an ending point domain) of a virtual path from the operation terminal 130 (Step S3). The terminal request receiving unit 101 newly generates "virtual path setting status management table" by a known technique. Then, the domain route search unit 102 calculates a route from the starting point administrative domain to the ending point administrative domain by Dijkstra's algorithm, and registers the result in the virtual path via-administrative domains sequence list table 122 (Step S4). In this manner, the domain route search unit 102 acquires a communication route from the starting point administrative domain to the ending point administrative domain.

The domain route search unit 102 sets a record where the address selection status field is non-completion as a record P in the virtual path setting status management table 127, and sets a value of the virtual path identifier field of the record P as a virtual path A (Step S5). In this manner, the domain route search unit 102 extracts a virtual path where an address has not been selected from the virtual path setting status management table 127.

When the record P exists, that is, when there is a virtual path that is not set (No in Step S6), the inter-administrative domain communication protocol stack list extraction unit 103 refers to the via-administrative domains sequence list table 122 and specifies a stack group identifier corresponding to the virtual path A that has been set by the domain route search unit 102 (Step S7). To be specific, the domain route search unit 102 specifies the stack group identifier in the inter-administrative domain communication protocol stack list table 123 that has all of the administrative domain identifiers in the via-administrative domains sequence list of the virtual path via-administrative domains sequence list table 122 corresponding to the virtual path A.

Then, the inter-administrative domain communication protocol stack list extraction unit 103 extracts records corresponding to the above-described stack group identifier, temporarily stores the sequence of the records in the sequence of the virtual path via-administrative domains sequence list table 122, and further, the available address extraction unit 104 extracts the available addresses of the domains in the virtual path via-administrative domains sequence list table 122 from the available address range table 124 (Step S8). In this manner, the available address extraction unit 104 acquires the available address of each protocol in the administrative domains.

After that, the target domain specifying unit 105 selects, as a record R1, the first record in the sequence among the extracted records (Step S9). Then, the target domain specifying unit 105 pops (extracts), as a protocol P, one protocol from the insertion protocol list of the record R1 (Step S10).

When the protocol P is not null (No in Step S11), the target domain specifying unit 105 initializes a variable C that is previously defined in a program or the like, and pushes (enters) the administrative domain identifier of the record R1 (Step S12). In this manner, the target domain specifying unit 105 specifies a domain for insertion by entering an insertion target of the protocol P into the variable C.

Then, the target domain specifying unit 105 selects, as a record R2, a record R1 that contains the protocol P in a list of removal protocols and that is closest to the record R1 in the communication direction of the virtual path A (which comes later in the sequence), among the records extracted by the inter-administrative domain communication protocol stack list extraction unit 103, and pops the protocol P from a list of removal protocols of the record R2, and pushes a value of the administrative domain identifier of the record R2 into the variable C (Step S13). In this manner, the target domain specifying unit 105 specifies a removal target of the protocol P.

The target domain specifying unit 105 pops the protocol P from a list of transfer protocols in all records between the record R1 and the record R2 in the sequence of the records extracted by the inter-administrative domain communication protocol stack list extraction unit 103, and pushes a value of the administrative domain identifier into the variable C (Step S14). In this manner, the target domain specifying unit 105 specifies a transfer target of the protocol P.

Then, the assignment unit 106 selects one from a group of available addresses of the protocol P in all administrative domains indicated by the value stored in the variable C, and adds a record where the selected address value is set as a value of the selected address identifier to the temporarily selected address table 125 (Step S15), and the process proceeds to Step S10.

In Step S11, when the protocol P is null (Yes in Step S11), the target domain specifying unit 105 selects a record after the record R1 as a new record R1 among the records extracted by the inter-administrative domain communication protocol stack list extraction unit 103 (Step S16), and the process proceeds to Step S17.

In Step S17, it is determined whether the record R1 is null or not, and when the record R1 is not null (No in Step S17), the process proceeds to Step S10.

In Step S17, when the record R1 is null (Yes in Step S17), the process proceeds to Step S18. In Step S18, based on the records of the temporarily selected address table 125, the assignment unit 106 adds a record to the selected address table 126 and sets the address selection status field in the record P to completion (Step S19), and the process proceeds to Step S5.

In Step S6, when the record P is null (Yes in Step S6), the notification unit 107 transmits a virtual path setting request to each point control device 150 of each domain based on the content of the selected address table 126 (Step S20).

The functions of the point control device 150 are described hereinafter with reference to the block diagram showing the overall configuration of the point control device 150 in FIG. 12. The point control device 150 includes a request receiving unit 151, a device route search unit 152, an intra-administrative domain communication protocol stack list extraction unit 153, an available address extraction unit 154, a target device specifying unit 155, an assignment unit 156, a setting unit 157, and a storage unit 170.

Further, the storage unit 170 includes a device connection table 171, an intra-administrative domain virtual path via-devices sequence list table 172, an intra-administrative domain communication protocol stack list table 173, an available address range table 174, and an intra-administrative domain selected address table 175.

The request receiving unit 151 receives an address set and also receives a virtual path setting request from the integrated control device 100. The request receiving unit 151 transmits the received virtual path setting request to the device route search unit 152.

After receiving the virtual path setting request from the request receiving unit 151, the device route search unit 152 refers to information of the device connection table 171 in the storage unit 170 and searches for a route from a starting point device to an ending point device by using a known route search technique (for example, Dijkstra's algorithm).

An example of the device connection table 171 is described with reference to FIG. 13. The device connection table 171 has information of devices that are adjacent to each other. The example of FIG. 13 shows that a relay device C and a relay device D are connected, and the relay device D and a relay device E are connected. Note that cable information that connects between those relay devices may be further added.

The device route search unit 152 searches for a route by referring to the above-described device connection table 171 and registers a result of route search in the intra-administrative domain virtual path via-devices sequence list table 172. Specifically, the device route search unit 152 registers, as a result of route search, sequence information from the starting point device to the ending point device and an identifier (virtual path identifier) of the sequence information in the intra-administrative domain virtual path via-devices sequence list table 172.

FIG. 14 shows an example of the intra-administrative domain virtual path via-devices sequence list table 172. As shown in FIG. 14, in the intra-administrative domain virtual path via-devices sequence list table 172, "via-administrative domains sequence list", which is information indicating the sequence of administrative domains indicating a virtual path, and a virtual path identifier, which is an identifier of the virtual path, are stored in association with each other. The device route search unit 152 notifies the intra-administrative domain communication protocol stack list extraction unit 153 of a result of route search (sequence information from the starting point device to the ending point device). Although the above-described via-administrative domains sequence list has sequence information from the starting point device to the ending point device, it may further have cable information that connects between those devices.

The intra-administrative domain communication protocol stack list extraction unit 153 receives a result of route search from the device route search unit 152, and extracts the intra-administrative domain communication protocol stack list table 173 corresponding to the sequence.

FIG. 15 shows an example of information stored in the intra-administrative domain communication protocol stack list table 173. As shown in FIG. 15, the intra-administrative domain communication protocol stack list table 173 contains a device identifier and a protocol stack list. The protocol stack list contains a removal protocol, a transfer protocol, and an insertion protocol.

The device identifier is an identifier held by the device. The protocol stack list defines the removal protocol, the transfer protocol, and the insertion protocol, which are a protocol to be removed, a protocol to be transferred and a protocol to be inserted in each device, respectively. For example, in the relay device C, there is no protocol to be removed, a protocol to be transferred is VLAN, and a protocol to be inserted is MPLS.

The intra-administrative domain communication protocol stack list extraction unit 153 extracts the intra-administrative domain communication protocol stack list table 173 based on information of the sequence list in the intra-administrative domain virtual path via-devices sequence list table 172.

In this manner, the intra-administrative domain communication protocol stack list extraction unit 153 acquires definition information that defines protocols to be inserted, transferred and removed in each device.

The intra-administrative domain communication protocol stack list extraction unit 153 sends the extracted records to the target device specifying unit 155. Further, the intra-administrative domain communication protocol stack list extraction unit 153 notifies the available address extraction unit 154 of the identifier of the target device.

The available address extraction unit 154 receives the identifiers of the devices corresponding to the virtual path from the intra-administrative domain communication protocol stack list extraction unit 153, and extracts the address range of the devices.

Specifically, the available address extraction unit 154 acquires the address range of the devices corresponding to the virtual path from the available address range table 174. FIG. 16 shows an example of the available address range table 174. As shown in FIG. 16, in the available address range table 174, a device identifier and an available address range are associated with each other. The example of FIG. 16 shows that, for the relay device C, available addresses in VLAN are 100 to 3999, and available addresses in MPLS are 16 to 1000000. Further, the identifier of the integrated control device, from which a request has been made, is also stored.

The available address extraction unit 154 acquires the address range of the devices corresponding to the virtual path from the available address range table 174 and then transmits the address range of the devices corresponding to the virtual path to the assignment unit 156.

The target device specifying unit 155 is a part that specifies devices where protocols are to be inserted, transferred or removed in the communication route acquired by the device route search unit 152 by using the records of the intra-device communication protocol stack list table 173 acquired by the intra-administrative domain communication protocol stack list extraction unit 153.

Specifically, the target device specifying unit 155 specifies the insertion protocol from the record of the starting point domain among the records of the inter-administrative domain communication protocol stack list acquired by the intra-administrative domain communication protocol stack list extraction unit 153, specifies a domain of a record of the removal protocol among the subsequent records, and further specifies a domain to transfer this protocol among the insertion protocol and the removal protocol. In this way, the target device specifying unit 155 specifies the insertion protocol, the removal protocol and the transfer protocol. Note that a method to specify the insertion protocol, the removal protocol and the transfer protocol is not limited to the above-described method, and they may be specified from the removal protocol, for example.

The assignment unit 156 is a part that assigns available addresses for protocols between the devices specified by the target device specifying unit 155 by using the available addresses acquired by the available address extraction unit 154.

Specifically, the assignment unit 156 assigns a common address to the protocols that is common to the respective domains to be assigned as the insertion protocol, the transfer protocol and the removal protocol.

After the assignment unit 156 assigns a common address to the protocols, it registers the result in the intra-administrative domain selected address table 175. FIG. 17 shows an example of the intra-administrative domain selected address table 175.

FIG. 17 shows the intra-administrative domain selected address table 175. The intra-administrative domain selected address table 175 has a request source integrated control device, a virtual path group identifier, a virtual path identifier, a device identifier, and a used address set. The example of FIG. 17 shows that, for the used address set where the request source integrated control device is an integrated control device A, the virtual path group identifier is a virtual path G1, the virtual path identifier is a virtual path 1, and the device identifier is a relay device C, there is no protocol to be removed (Pop{ }), a protocol to be transferred is VLAN and its address is 100 (Forward:{VLAN:100}), and a protocol to be inserted is MPLS and its address is 100 (Push:{MPLS:100}).

The setting unit 157 refers to the intra-administrative domain selected address table 175 at specified timing, and requests each device (processing device, relay device) to set the address set. Specifically, the setting unit 157 sets the address assigned by the assignment unit 156 to each processing device and relay device.

The operation of an administrative domain according to this embodiment is described hereinafter with reference to the flowchart of FIG. 18. The flowchart of in FIG. 18 shows a process of receiving an address set and also receiving a virtual path setting request from the integrated control device 100 and setting the transfer of a communication packet.

First, the intra-administrative domain virtual path via-devices sequence list table 172 and the intra-administrative domain communication protocol stack list table 173 are stored in advance (Step S31), and it waits to receive a virtual path setting request from the integrated control device 100 (Step S32).

Then, the request receiving unit 151 receives a virtual path setting request from the integrated control device 100 (Step S33). The device route search unit 152 then calculates a route from a starting point device to an ending point device by Dijkstra's algorithm (Step S34).

Then, the target device specifying unit 155 specifies a target device by using the intra-administrative domain communication protocol stack list table 173. The assignment unit 156 then assigns available addresses for protocols between the domains specified by the target device specifying unit 155 by using the intra-administrative domain available address range table 174. The assignment unit 156 then adds it to a record in the intra-administrative domain selected address table (Step S35).

After that, the setting unit 157 adds the setting of insertion and removal of protocols to communication packets and transfer of communication packets to each device based on the address of each protocol assigned to the virtual path A (Step S36).

As described above, when the address set is notified to each administrative domain by the integrated control device 100, each administrative domain performs addressing based on the address set.

FIG. 19 shows an example where packet data is transmitted from the administrative domain A to the administrative domain B based on this setting.

First, the administrative domain A receives the address set from the integrated control device 100, and after performing addressing based on the received address set, sets the addresses of the IP2 layer, the VXLAN layer, the IP layer and the VLAN layer for packet data (packet data 1). Further, in the administrative domain A, the addresses of the Ethernet (registered trademark) layer and the Ethernet2 layer are automatically set by a known technique. To be specific, a target device (for example, a device in an administrative domain) sets the addresses of the Ethernet layer and the Ethernet2 layer by using ARP (Address Resolution Protocol).

FIG. 20 shows an example of packet data. FIG. 20(A) is a data example of packet data 1. The packet data 1 has the input region of the addresses of the Ethernet layer, the VLAN layer, the IP layer, the VXLAN layer, the Ethernet2 layer and the IP2 layer as head information, and further has payload of the input region of data to be transferred.

Because the Ethernet layer is removed in the relay device F in the domain E, the destination is a MAC address of NIC of the relay device F, and the source is a MAC address of NIC of the processing device A.

Further, for the Ethernet2 layer, a virtual NIC address of the processing device A in the domain A is set as the source, and a MAC address of virtual NIC of the processing device B is set as the destination.

The address set notified by the integrated control device 100 is set to the layers other than the Ethernet layer and the Ethernet2 layer described above.

The administrative domain A transmits the generated packet data to the administrative domain C through "Cable-A". Then, the administrative domain C transfers the address of the VLAN layer and transmits it to the administrative domain E through "Cable-B".

The administrative domain E receives the packet data 1 and removes the VLAN layer and the Ethernet layer of the packet data, transfers it in the IP layer, inserts the address of the Ethernet layer and the address of the VLAN layer, generates packet data 2, which is new packet data, and transmits it to the administrative domain D through "Cable-C".

FIG. 20(B) shows an example of the packet data 2. As shown in FIG. 20(B), a MAC address of NIC of the relay device F is set to the source of the Ethernet layer, and a MAC address of NIC of the processing device B is set to the destination.

Further, in response to a notification by the notification unit 107, the administrative domain E sets the address of the VLAN layer to "200" and transmits it to the administrative domain D.

In the administrative domain D, data is transferred in the VLAN layer and transmitted to the administrative domain B through "Cable-D". The administrative domain B checks whether it is addressed to the administrative domain B or not, and removes the VLAN layer, the Ethernet layer, the IP layer, the VXLAN layer, the Ethernet2 layer and the IP2 layer.

In this manner, by generating packet data based on the address set notified by the integrated control device 100 and transmitting this packet data in each domain, the packet data is transmitted along the virtual path.

Figure 21:
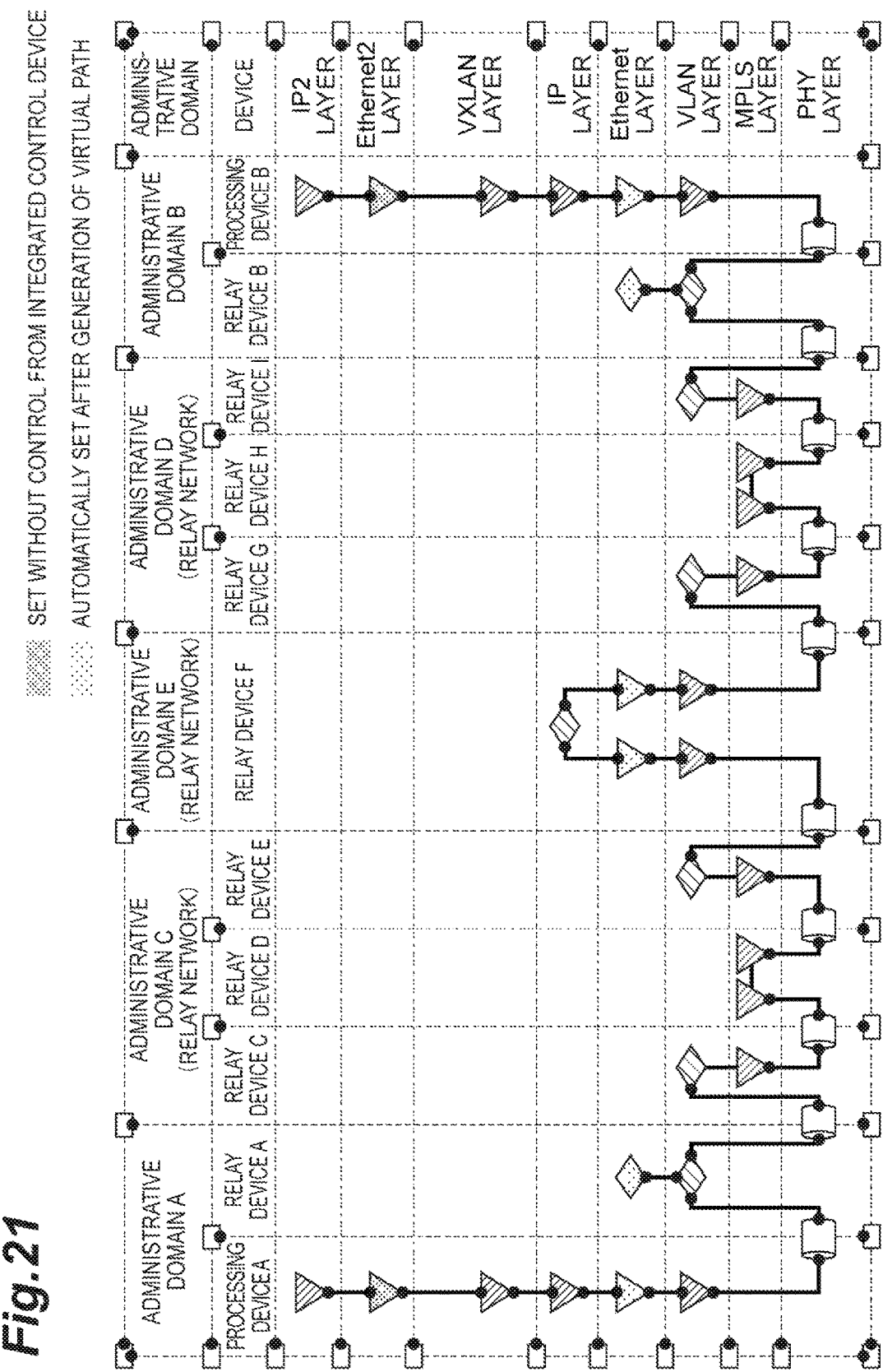
FIG. 21 is a view showing a packet data transmission and reception state between domains and between devices.

FIG. 21 shows an example of transmitting a communication packet in each domain. First, the processing device A in the administrative domain A generates packet data in which the addresses of the IP2 layer, the VXLAN layer, the IP layer, the Ethernet layer and the VLAN layer are set to header information, and transmits it to the relay device A through a cable.

FIG. 22 shows an example of packet data that is transmitted in each domain. As shown in FIG. 22, it is the same as data shown in FIG. 20 except that it has the input region of the MPLS layer.

The relay device A transfers the address of the VLAN layer and the address of the Ethernet layer, and transmits them to the administrative domain C through a cable. After that, a processing device and a relay device in each administrative domain performs the removal, transfer and insertion of the layers until transmission to the processing device B in the administrative domain.

(Second Embodiment)

A second embodiment is described hereinafter. Although the case where an address is assigned between domains including the point control device (150A etc.) is described in the first embodiment, an example in which the point control device 150 is not located and a use address is fixed is described in the second embodiment.

For example, when the terminal request receiving unit 101 receives, from the operation terminal 130, a virtual path generation request from the administrative domain A to the administrative domain G, the domain route search unit 102 searches for a route in the sequence of the administrative domain A→the administrative domain F→the administrative domain G. It is assumed that the address of the IP2 layer in the administrative domain F and the administrative domain G has been fixed in advance, and this address has been transmitted from the point control device 150F to the integrated control device 100. In other words, the available address extraction unit 104 acquires, from the point control device 150F, the address information of the IP2 layer in the administrative domain F and the administrative domain G as fixed address information.

In this case, the processing up to domain setting is the same as that described in the first embodiment except for acquiring the fixed address information as described above. In the second embodiment, the assignment unit 106 assigns the address of the administrative domain A according to the address of the IP layer 2 in the administrative domain F, G. In other words, the assignment unit 106 assigns the address by further using the fixed address information acquired by the available address extraction unit 104.

Figure 23:
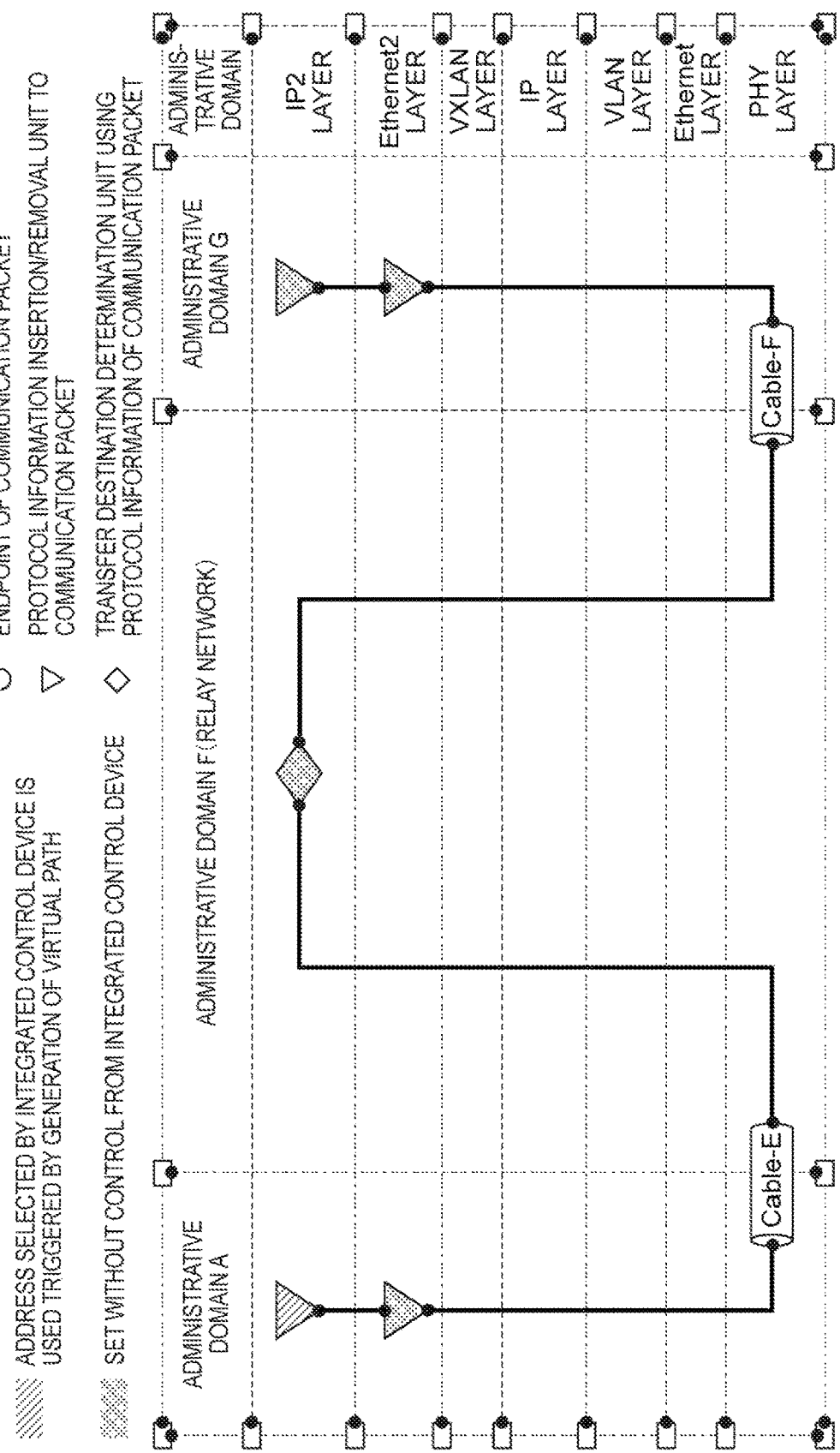
FIG. 23 is a view showing a packet data transmission and reception state between domains according to a second embodiment.

After the assignment by the assignment unit 106, the processing is the same as that described in the first embodiment. FIG. 23 shows an example of transmitting packet data from the administrative domain A to the administrative domain G. First, the point control device 150A in the administrative domain A performs addressing for each device (the processing device A, the relay device A) based on the address set received from the integrated control device 100.

The administrative domain A sets the address of the IP2 selected by the integrated control device 100 and sets the address of the Ethernet2 layer by a known technique to the header of the packet data to be transmitted, and transmits it to the administrative domain F through "Cable-E". The subsequent processing is the same as the processing of the first embodiment.

Figure 24:
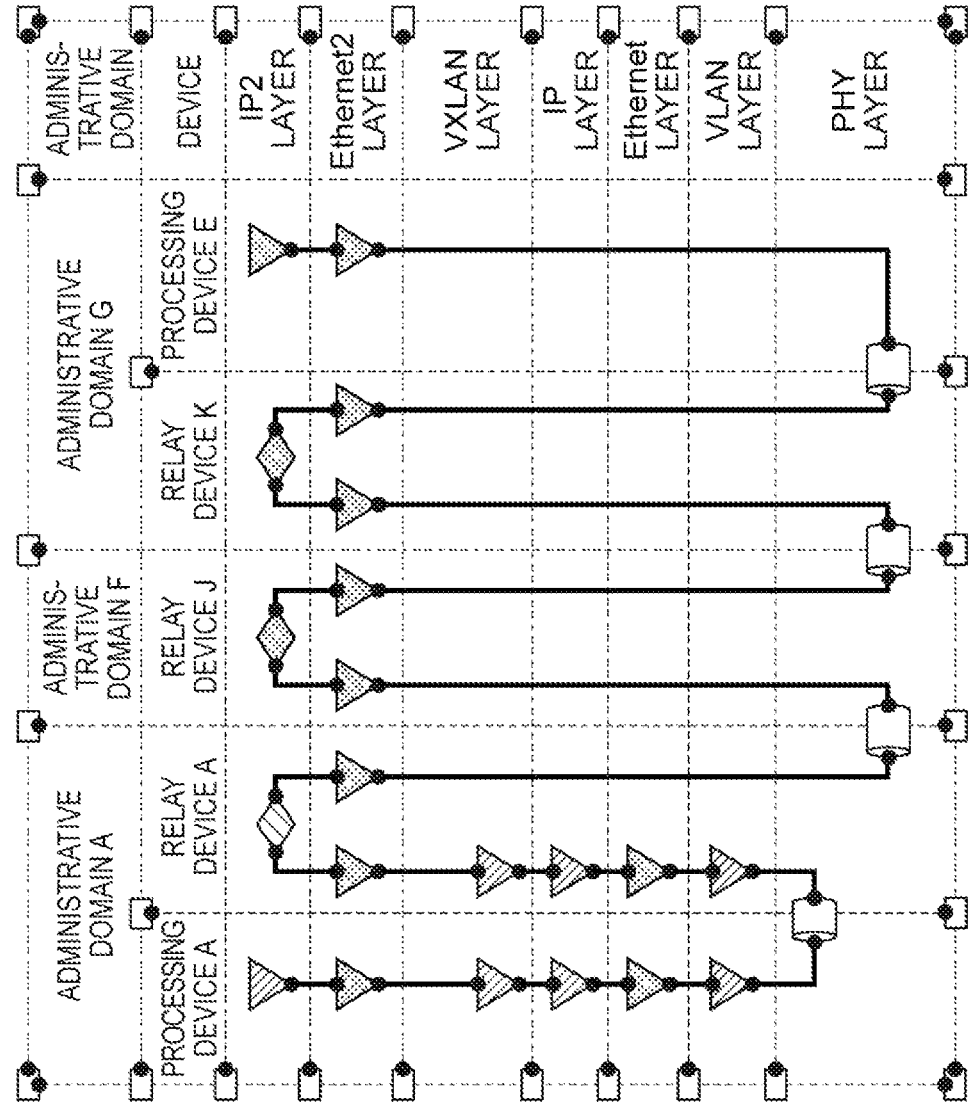
FIG. 24 is a view showing a packet data transmission and reception state between domains and devices according to the second embodiment.

FIG. 24 shows processing in each domain. The processing device A sets the addresses of the IP2 layer, the VXLAN layer, the IP layer and the VLAN layer at a header part of packet data to be transmitted based on the address set received from the point control device 150A. Further, the processing device A sets the address of the Ethernet layer and the address of the Ethernet2 layer by a known technique. Then, the processing device A transmits the packet data to the relay device A through a cable ("Cable-A"). The relay device A refers to the addresses of the VLAN layer, the Ethernet layer, the IP layer, the VXLAN layer and the Ethernet2 layer and checks that they are addressed to the relay device A, and removes those addresses. After that, the relay device A transfers the address of the IP2 layer, sets the address of the Ethernet2 layer at the header of the packet data, and transmits the packet data to the relay device J in the administrative domain F.

The relay device A in the administrative domain A and the relay device K in the administrative domain G set the IP2 layer as a transfer address in accordance with the IP layer 2 of the relay device J in the administrative domain F.

(Third Embodiment)

A third embodiment is described hereinafter. The case where an address is assigned between domains including the point control device (150A etc.) is described in the first embodiment; however, in the third embodiment, the point control device 150 that controls devices in a domain is not located, and an address is set when there is a domain to which a use address is fixed on a virtual path.

Figure 25:
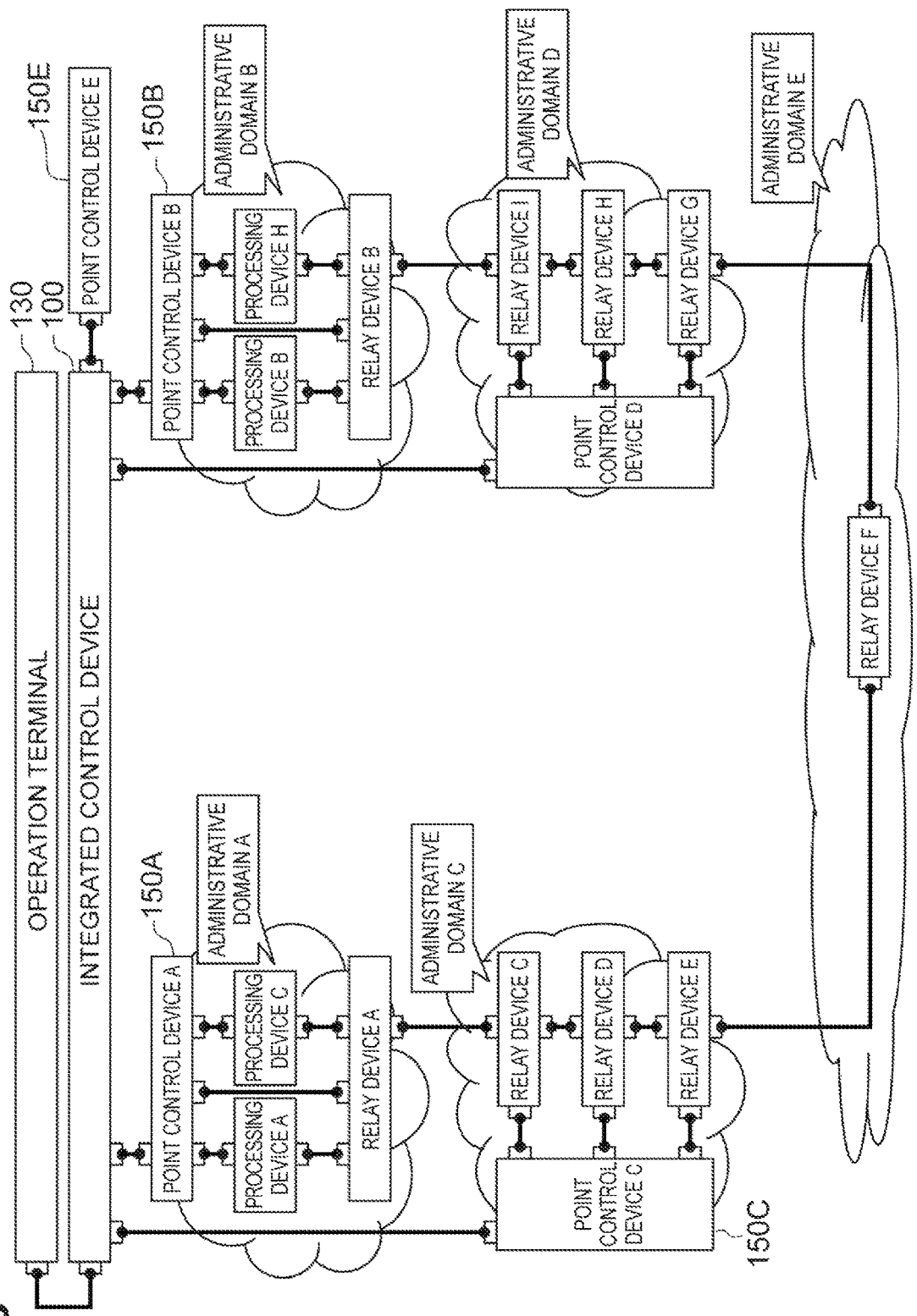
FIG. 25 is a system configuration diagram of a communication system that includes an integrated control device 100 according to a third embodiment.

FIG. 25 is an outline view of a network configuration according to the third embodiment. Note that only the administrative domain E does not include the point control device 150 that controls a device (relay device F) in the domain. For example, when the terminal request receiving unit 101 receives, from the operation terminal 130, a virtual path generation request from the administrative domain A to the administrative domain B, the domain route search unit 102 searches for a route in the sequence of the administrative domain A→the administrative domain C→the administrative domain E→the administrative domain D→the administrative domain B. It is assumed that the address of the IP2 layer in the administrative domain E has been fixed in advance, and the fixed address has been transmitted from the point control device 150E that manages the fixed address to the integrated control device 100. In other words, the available address extraction unit 104 acquires, from the point control device 150E, the address information of the IP2 layer in the administrative domain E as fixed address information.

FIG. 26 shows the inter-administrative domain communication protocol stack list table 123 corresponding to the current virtual path. As shown in FIG. 26, the administrative domains A and B remove and insert IP, VXLAN VLAN2 and IP2, and the administrative domain E transfers IP. The administrative domains C and D are the same as the administrative domain E.

In this case, the processing up to domain setting is the same as that described in the first embodiment except for acquiring the fixed address information as described above. In the third embodiment, the assignment unit 106 assigns the addresses of the administrative domain A, the administrative domain C, the administrative domain E, the administrative domain D and the administrative domain B according to the address of the IP layer in the administrative domain E. In other words, the assignment unit 106 assigns the address by further using the fixed address information acquired by the available address extraction unit 104.

Figure 27:
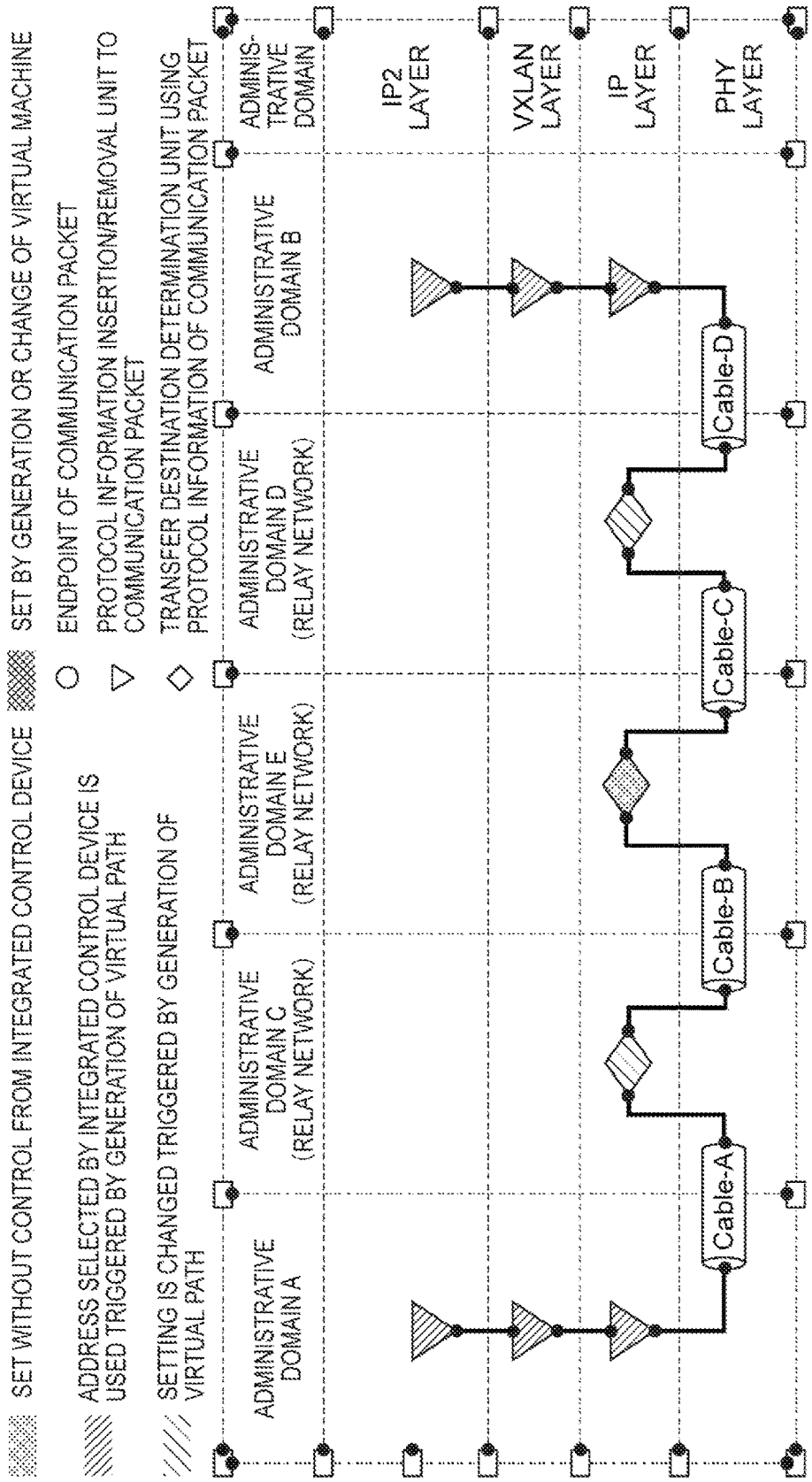
FIG. 27 is a view showing a packet data transmission and reception state between domains and devices according to the third embodiment.

After the assignment by the assignment unit 106, the processing is the same as that described in the first embodiment. FIG. 27 shows an example of transmitting packet data from the administrative domain A to the administrative domain B. First, the point control device of each of the administrative domain A, the administrative domain C, the administrative domain D and the administrative domain B performs addressing for each device (the processing device, the relay device) in the domain based on the address set received from the integrated control device 100.

The administrative domain A sets the addresses of IP2, VXLAN2 and IP selected by the integrated control device 100 at the header of the packet data to be transmitted, and transmits it to the administrative domain C through "Cable-A". The subsequent processing is the same as the processing of the first embodiment. Note that the address of the IP layer that is transferred in the administrative domain E is fixed in advance, and the fixed address of the IP layer is transferred in the administrative domain C that transmits data to the administrative domain E and the administrative domain D that receives data from the administrative domain E.

Figure 28:
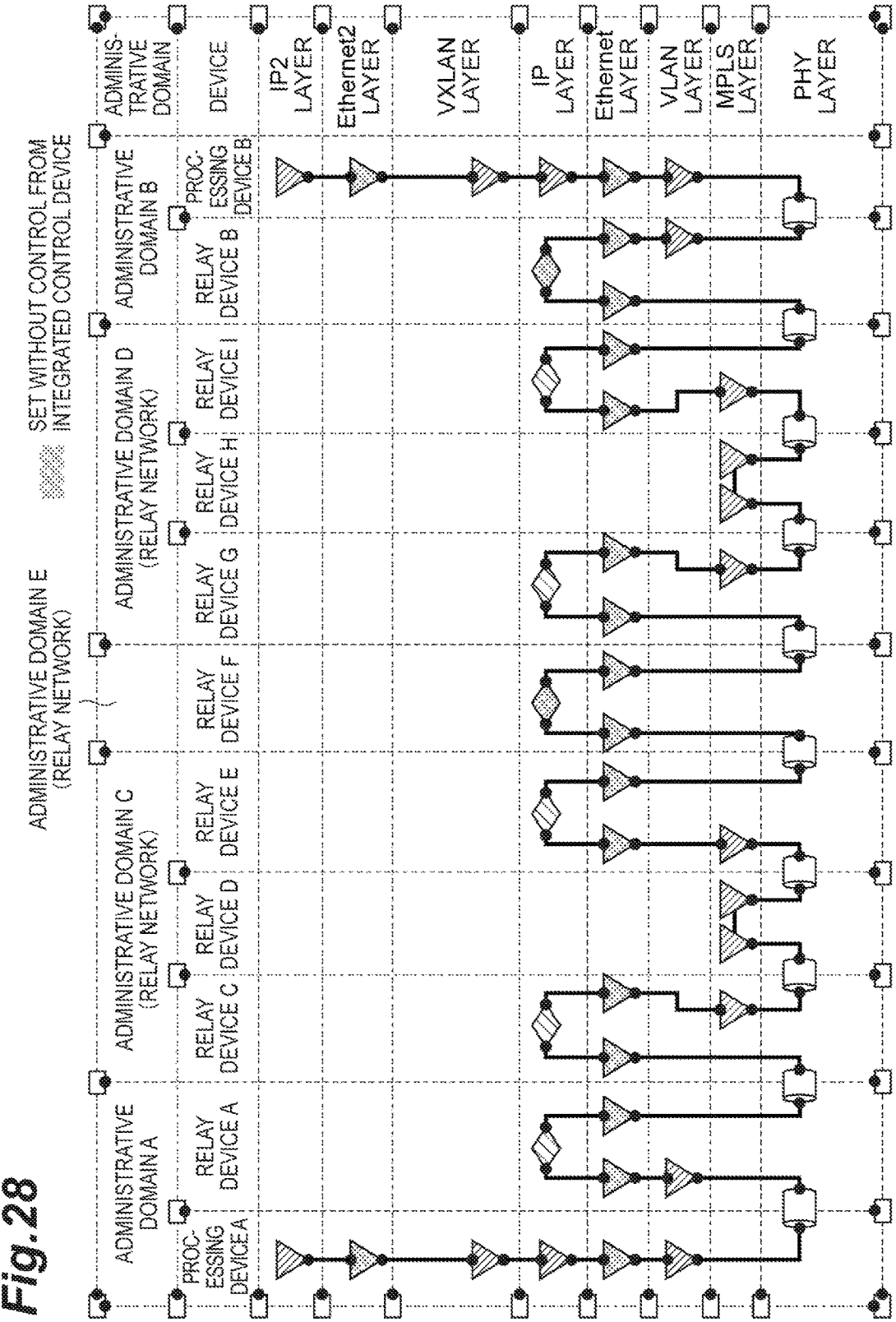
FIG. 28 is a view showing a packet data transmission and reception state between domains and devices according to the third embodiment.

FIG. 28 shows processing in each domain. The processing device A sets the addresses of the IP2 layer, the VXLAN layer, the IP layer and the VLAN layer at a header part of packet data to be transmitted based on the address set received from the point control device 150A. Further, the processing device A sets the address of the Ethernet layer and the address of the Ethernet2 layer by a known technique. Then, the processing device A transmits the packet data to the relay device A through a cable ("Cable-A"). The relay device A refers to the addresses of the VLAN layer and the Ethernet layer and checks that they are addressed to the relay device A, and removes those addresses. After that, the relay device A transfers the address of the IP layer, sets the address of the Ethernet layer at the header of the packet data, and transmits the packet data to the relay device C in the administrative domain C. After that, the packet data is transmitted to the processing device B in the administrative domain B through devices in each administrative domain by the same processing as the first embodiment. Note that the relay device E in the administrative domain C and the relay device G in the administrative domain D set the IP layer as a transfer address in accordance with the IP layer of the relay device F in the administrative domain E.

(Fourth Embodiment)

A fourth embodiment is described hereinafter. The case where the integrated control device 100 determines address assignment for communication between administrative domains as the domain control device is described in the first to third embodiments; however, in the fourth embodiment, an integrated control device 100A searches for a communication route as the domain control device, and each of the point control devices 150 performs address assignment for communication between administrative domains as the domain control device.

Figure 29:
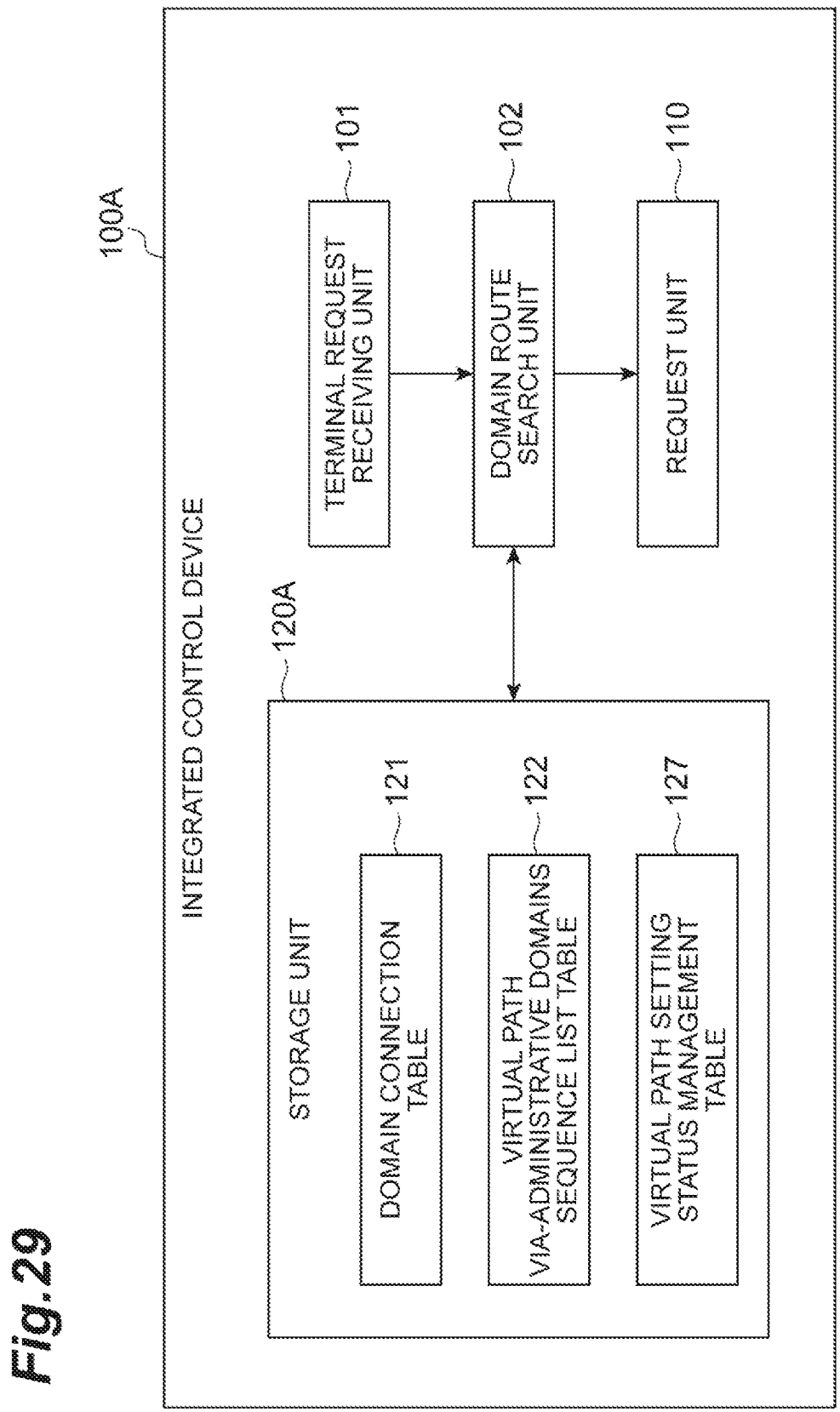
FIG. 29 is a functional block diagram of an integrated control device 100A according to a fourth embodiment.

First, the functions of the integrated control device 100A according to the fourth embodiment are described with reference to the block diagram showing the overall configuration in FIG. 29. The integrated control device 100A includes a terminal request receiving unit 101, a domain route search unit 102, a request unit 110, and a storage unit 120A. The storage unit 120A includes a domain connection table 121, a virtual path via-administrative domains sequence list table 122, and a virtual path setting status management table 127.

Figure 2:
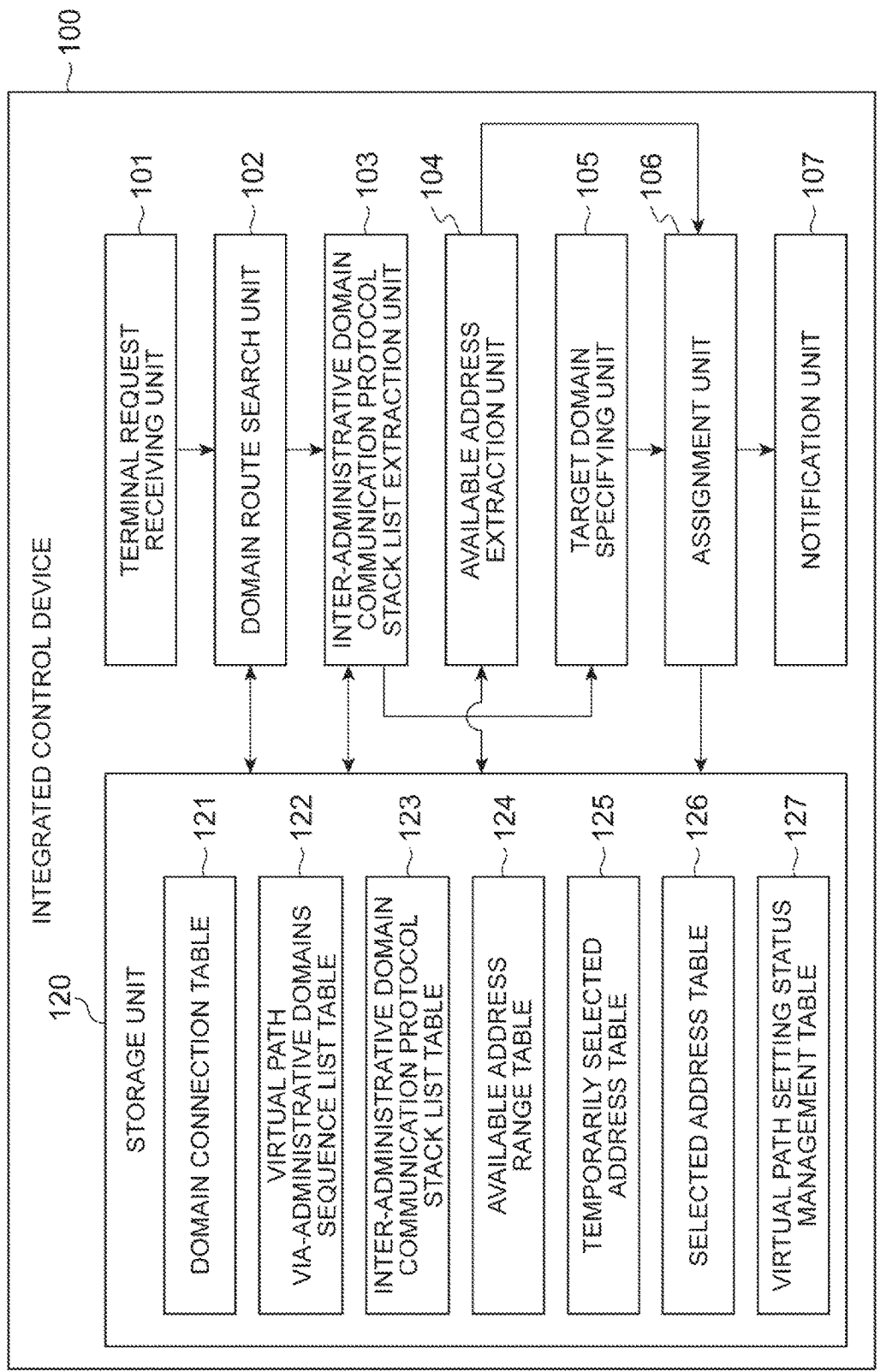
FIG. 2 is a functional block diagram of the integrated control device 100.

The terminal request receiving unit 101, the domain route search unit 102, the domain connection table 121, the virtual path via-administrative domains sequence list table 122 and the virtual path setting status management table 127 are respectively the same as the terminal request receiving unit 101, the domain route search unit 102, the domain connection table 121, the virtual path via-administrative domains sequence list table 122 and the virtual path setting status management table 127 of the integrated control device 100 shown in FIG. 2 and therefore not redundantly described.

The request unit 110 sends a notification of a via-administrative domains sequence list to a point control device 150A2 in the domain at the starting point of a route based on the route searched by the domain route search unit 102, and makes an address setting request. Further, when the request unit 110 receives a notification that addressing is done from the point control device 150A2 in the requested domain, it registers information that setting is done in the virtual path setting status management table 127.

Figure 30:
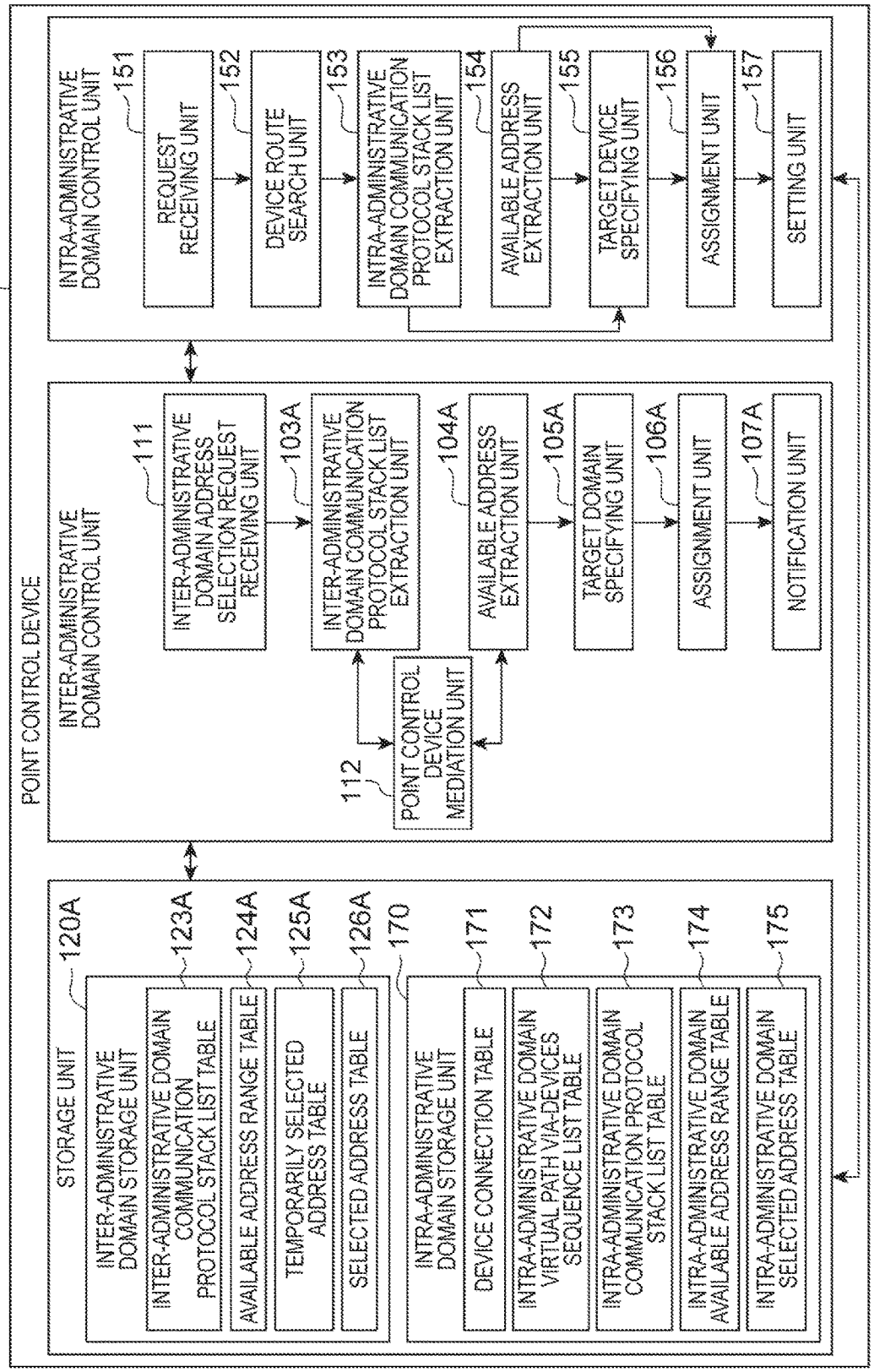
FIG. 30 is a functional block diagram of a point control device 150A2 according to the fourth embodiment.

The functions of the point control device 150A2 according to the fourth embodiment are described hereinafter with reference to the block diagram showing the overall configuration in FIG. 30. The point control device 150A2 includes an inter-administrative domain control unit, an intra-administrative domain control unit, and a storage unit.

The inter-administrative domain control unit includes an inter-administrative domain address selection request receiving unit 111, an inter-administrative domain communication protocol stack list extraction unit 103A, an available address extraction unit 104A, a target domain specifying unit 105A, an assignment unit 106A, a notification unit 107A, and a point control device mediation unit 112. The intra-administrative domain control unit includes a request receiving unit 151, a device route search unit 152, an intra-administrative domain communication protocol stack list extraction unit 153, an available address extraction unit 154, a target device specifying unit 155, an assignment unit 156, and a setting unit 157.

The storage unit includes an inter-administrative domain storage unit 120A and an intra-administrative domain storage unit 170. The inter-administrative domain storage unit 120A includes an inter-administrative domain communication protocol stack list table 123A, an available address range table 124A, a temporarily selected address table 125A and a selected address table 126A. The intra-administrative domain storage unit 170 includes a device connection table 171, an intra-administrative domain virtual path via-devices sequence list table 172, an intra-administrative domain communication protocol stack list table 173, an intra-administrative domain available address range table 174, and an intra-administrative domain selected address table 175.

Figure 12:
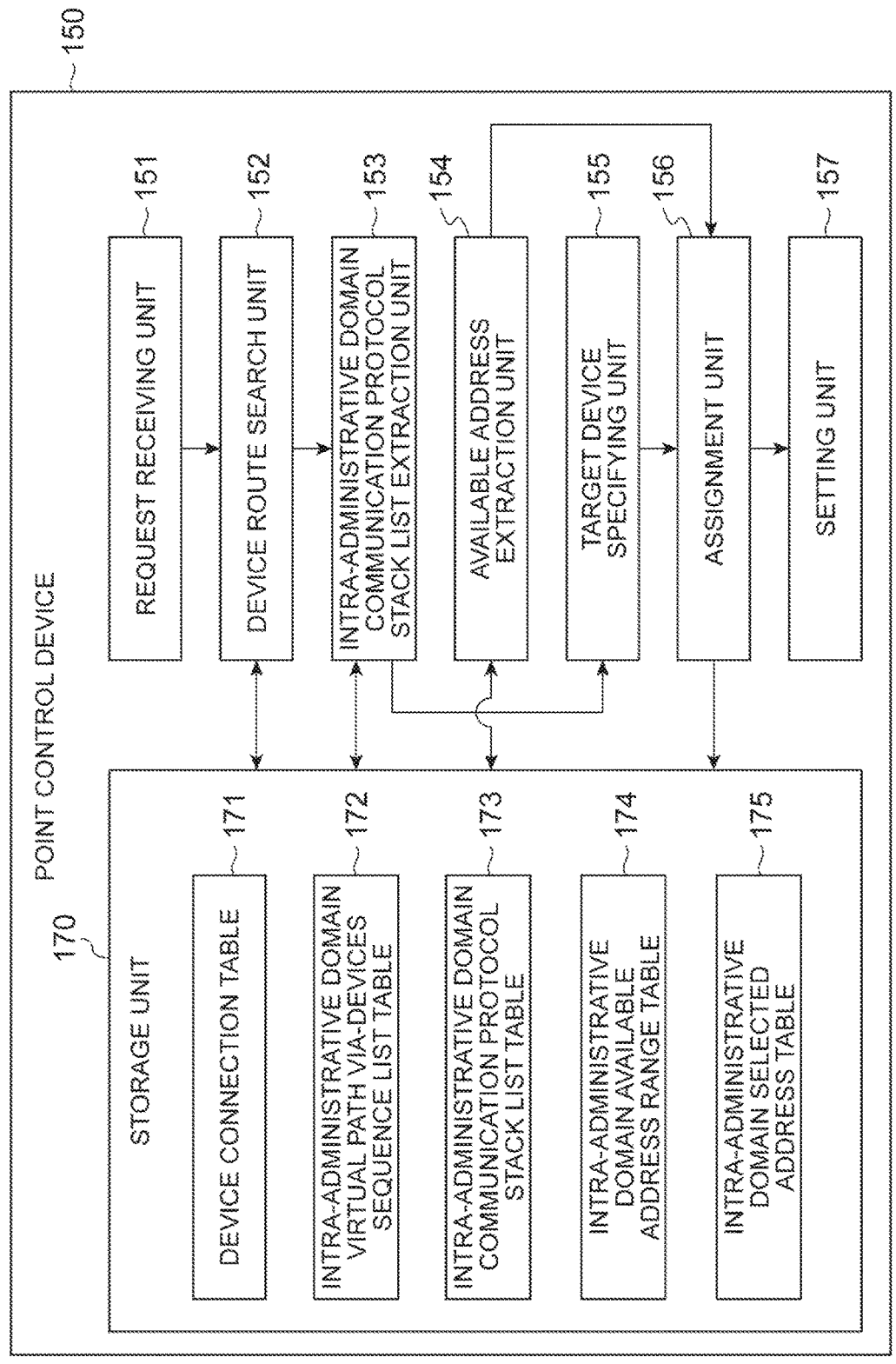
FIG. 12 is a functional block diagram of a point control device 150.

The request receiving unit 151, the device route search unit 152, the intra-administrative domain communication protocol stack list extraction unit 153, the available address extraction unit 154, the target device specifying unit 155, the assignment unit 156 and the setting unit 157 of the intra-administrative domain control unit are respectively the same as the request receiving unit 151, the device route search unit 152, the intra-administrative domain communication protocol stack list extraction unit 153, the available address extraction unit 154, the target device specifying unit 155, the assignment unit 156 and the setting unit 157 of the point control device 150 shown in FIG. 12 and therefore not redundantly described.

Further, the device connection table 171, the intra-administrative domain virtual path via-devices sequence list table 172, the intra-administrative domain communication protocol stack list table 173, the intra-administrative domain available address range table 174 and the intra-administrative domain selected address table 175 of the intra-administrative domain storage unit 170 are respectively the same as the device connection table 171, the intra-administrative domain virtual path via-devices sequence list table 172, the intra-administrative domain communication protocol stack list table 173, the intra-administrative domain available address range table 174 and the intra-administrative domain selected address table 175 of the point control device 150 shown in FIG. 12 and therefore not redundantly described.

The inter-administrative domain address selection request receiving unit 111 receives a via-administrative domains sequence list and also receives an inter-administrative domain address selection request from the integrated control device 100A. Then, it sends this request together with the via-administrative domains sequence list to the inter-administrative domain communication protocol stack list extraction unit 103A.

Like the inter-administrative domain communication protocol stack list extraction unit 103A shown in FIG. 2, the inter-administrative domain communication protocol stack list extraction unit 103A receives the via-administrative domains sequence list from the inter-administrative domain address selection request receiving unit 111, and extracts a record corresponding to the sequence from the inter-administrative domain communication protocol stack list table 123A. Note that, when there is a domain in the via-administrative domains sequence list which is not included in the inter-administrative domain communication protocol stack list table 123A, the inter-administrative domain communication protocol stack list extraction unit 103A makes an inquiry to the point control device mediation unit 112 to request the acquisition of an inter-administrative domain communication protocol stack list of this domain. As described later, because the point control device 150A2 deletes an inter-administrative domain communication protocol stack list related to another domain at specified timing, there arises a lack of an inter-administrative domain communication protocol stack list related to another domain.

When the inter-administrative domain communication protocol stack list extraction unit 103A receives, by the point control device mediation unit 112, a notification of acquisition of the inter-administrative domain communication protocol stack list of the domain from another domain, it extracts the lacking inter-administrative domain communication protocol stack list.

Like the available address extraction unit 104 shown in FIG. 2, the available address extraction unit 104A receives the via-administrative domains sequence list from the inter-administrative domain communication protocol stack list extraction unit 103A, and extracts the address range of the administrative domain in the via-administrative domains sequence list from the available address range table 124A. Note that, when there is a domain in the via-administrative domains sequence list which is not contained in the available address range table 124A, the available address extraction unit 104A makes an inquiry to the point control device mediation unit 112 to request the acquisition of the available address range. As described later, because the point control device 150A2 deletes an available address range table related to another domain at specified timing, there arises a lack of an available address range table related to another domain.

The available address extraction unit 104A receives, by the point control device mediation unit 112, a notification of acquisition of the address range of the administrative domain from another domain, it extracts the lacking address range of a lacking administrative domain.

The target domain specifying unit 105A, the assignment unit 106A and the notification unit 107A are respectively the same as the target domain specifying unit 105A, the assignment unit 106A and the notification unit 107A shown in FIG. 2 and therefore not redundantly described.

The point control device mediation unit 112 makes an inquiry to a target domain about the lacking inter-administrative domain communication protocol stack list and the lacking address range table. Further, when the point control device mediation unit 112 acquires the lacking inter-administrative domain communication protocol stack list and the lacking address range table, it registers them in the inter-administrative domain communication protocol stack list table 121A and the available address range table 122A, respectively, and notifies the inter-administrative domain communication protocol stack list extraction unit 103A and the available address extraction unit 104A that registration is done. When making an inquiry to a target domain, the point control device mediation unit 112 may directly make an inquiry to the target domain or make an inquiry via another domain.

Further, when the point control device mediation unit 112 receives an acquisition request for the lacking inter-administrative domain communication protocol stack list and address range table from a point control device in another domain, it transmits the inter-administrative domain communication protocol stack list and the address range table in its domain to the device that has made the request.

The inter-administrative domain communication protocol stack list table 123A, the available address range table 124A, the temporarily selected address table 125A and the selected address table 126A are basically the same as the inter-administrative domain communication protocol stack list table 123, the available address range table 124, the temporarily selected address table 125 and the selected address table 126 shown in FIG. 2.

Note that the inter-administrative domain control unit may delete information other than those of its own domain in the inter-administrative domain communication protocol stack list table 123A and the available address range table 124A after a specified period has elapsed.

Figure 31:
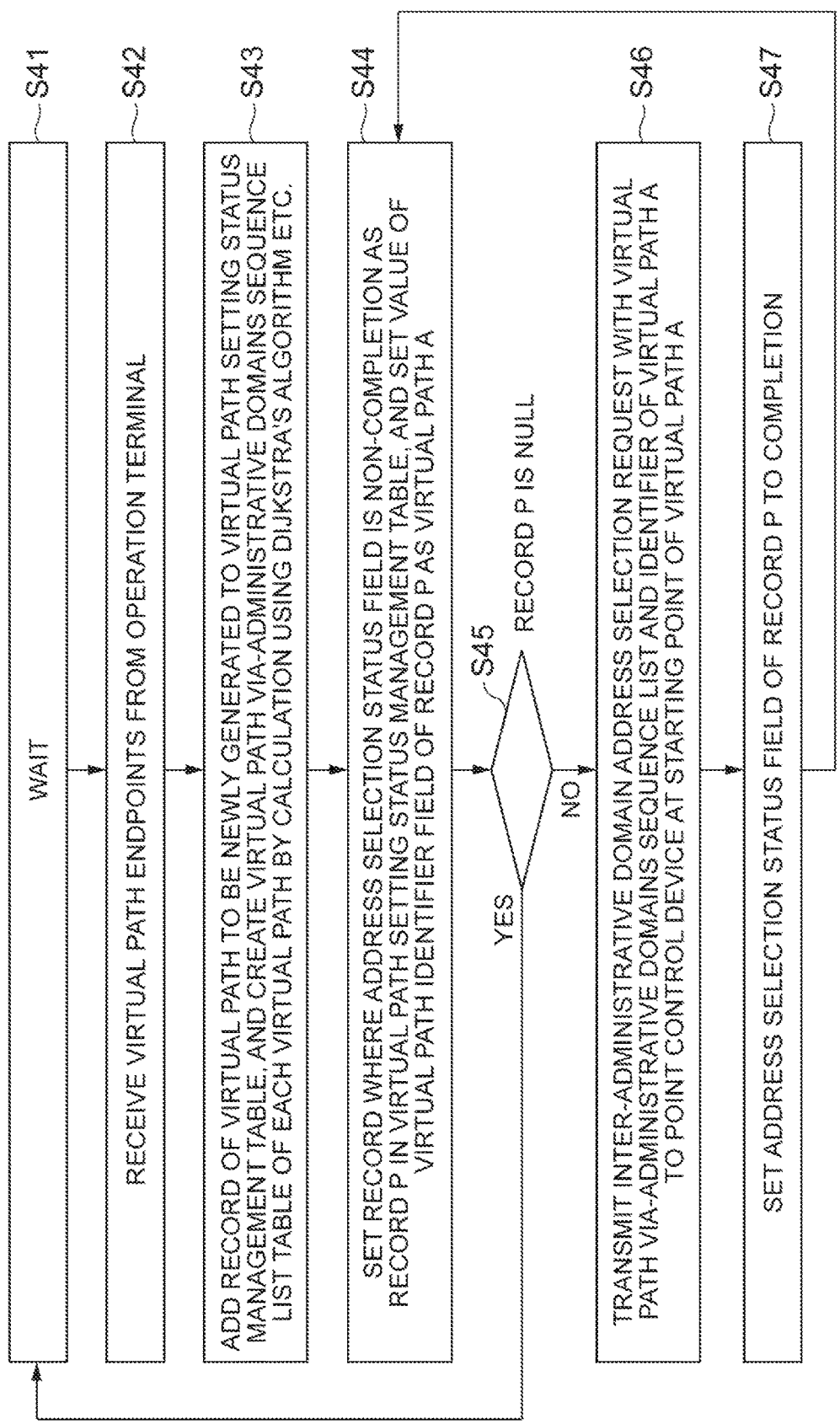
FIG. 31 is a flowchart of a process performed in the integrated control device 100A according to the fourth embodiment.

The process of the integrated control device 100A is described hereinafter with reference to the flowchart of FIG. 31. The terminal request receiving unit 101 waits to for input (Step S41), and when the terminal request receiving unit 101 receives the input of virtual path terminal endpoints (starting point and ending point) from the operation terminal 130 (Step S42), the terminal request receiving unit 101 newly generates "virtual path setting status management table" by a known technique. Then, the domain route search unit 102 calculates a route from the starting point administrative domain to the ending point administrative domain by Dijkstra's algorithm and registers the result in the virtual path via-administrative domains sequence list table 122 (Step S43).

The domain route search unit 102 then sets a record where the address selection status field is non-completion as a record P in the virtual path setting status management table 127, and sets a value of the virtual path identifier field of the record P as a virtual path A (Step S44). In this manner, the domain route search unit 102 extracts a virtual path where an address has not been selected from the virtual path setting status management table 127.

When the record P exists, that is, when there is a virtual path that is not set (No in Step S45), the request unit 110 transmits an inter-administrative domain address selection request with a virtual path via-administrative domains sequence list and a virtual path A identifier to the point control device 150A2 which is the starting point of the virtual path A (Step S46).

When the request unit 110 receives a notification of completion of inter-administrative domain address selection from the point control device 150A2, it sets the address selection status field in the record P to completion (Step S47), and the process proceeds to Step S44. Note that, when it is determined that the record P is null in Step S45 (Yes in Step S45), the process proceeds to Step S41.

Figure 32:
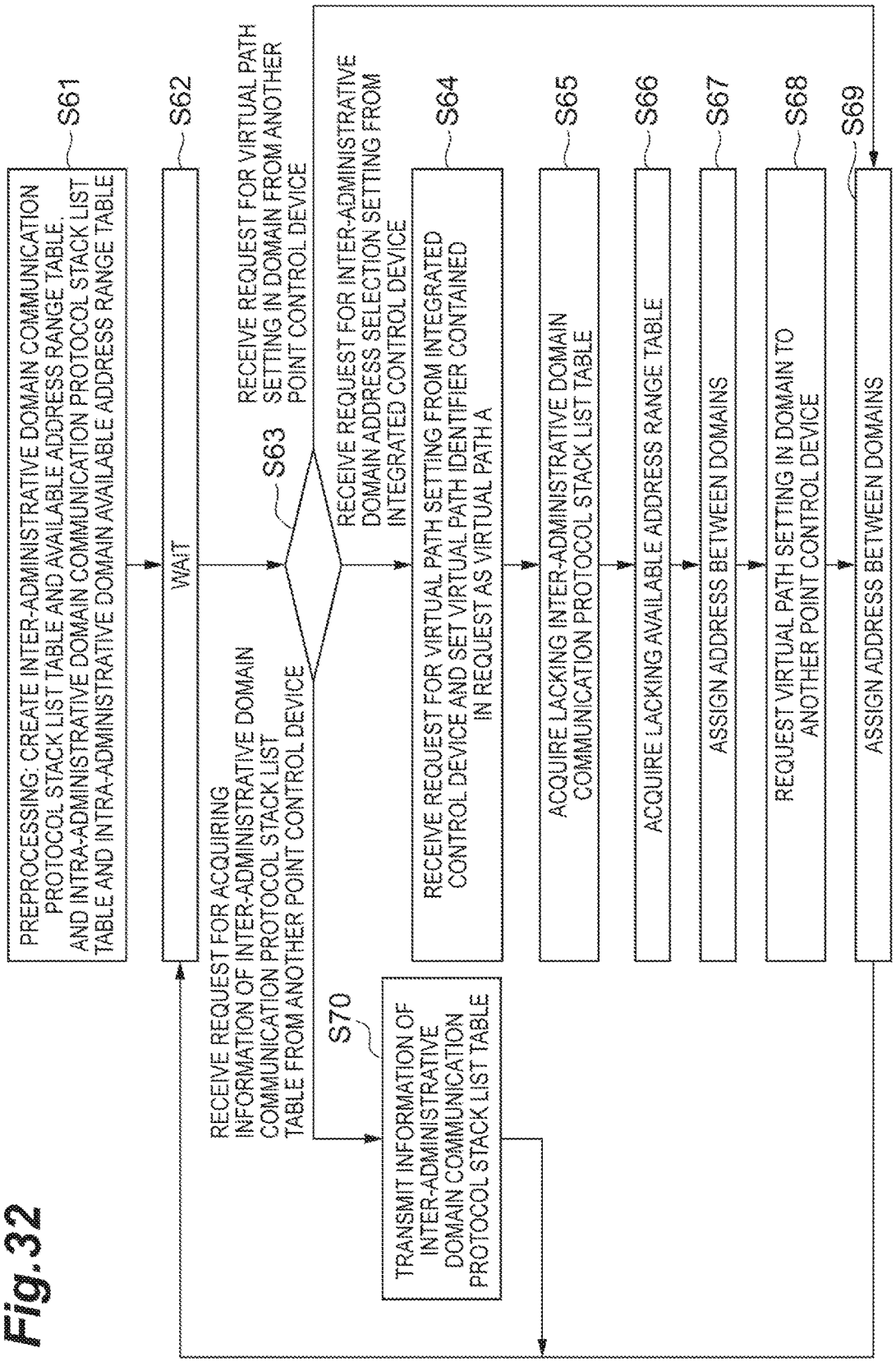
FIG. 32 is a flowchart of a process performed in the point control device 150A2 according to the fourth embodiment.

The process of the point control device 150A2 is described hereinafter with reference to the flowchart of FIG. 32. First, the virtual path via-administrative domains sequence list table 122 and the inter-administrative domain communication protocol stack list table 123 are prepared in advance (Step S61), and the point control device 150A2 waits to receive processing from an external devices (Step S62).

As a result of receiving a request from an external device (Step S63), when it is an inter-administrative domain address selection setting request from the integrated control device 100A, the inter-administrative domain communication protocol stack list extraction unit 103A receives a virtual path setting request from the integrated control device 100A, and sets a virtual path identifier contained in the request as a virtual path A (Step S64).

Then, when there is a domain in the via-administrative domains sequence list which is not included in the inter-administrative domain communication protocol stack list table 123A, the inter-administrative domain communication protocol stack list extraction unit 103A makes a request to the point control device mediation unit 112 to acquire an inter-administrative domain communication protocol stack list of this domain, and the point control device mediation unit 112 acquires the lacking inter-administrative domain communication protocol stack list (Step S65).

Then, when there is a domain in the via-administrative domains sequence list which is not contained in the available address range table 124A, the available address extraction unit 104A makes an inquiry to the point control device mediation unit 112 to request the acquisition of the available address range, and the point control device mediation unit 112 acquires the lacking available address table (Step S66). Note that, when the point control device mediation unit 112 makes an inquiry to the point control device 150A2 to acquire the lacking domain, it may not only notify that it is a lacking domain but also transmit the available address range table stored in its point control device (for example, the available address range table of its domain). In this case, the point control device in the lacking domain, which is an external device, can narrow down the available address range to be transmitted and transmit the narrowed address range. As a result, the point control device in the lacking domain can reduce the communication load for transmission, particularly, when it has the available address range in fragments.

Then, the inter-administrative domain control unit performs address assignment between domains (Step S67). Specifically, the same processing as in Steps S7 to S18 of FIG. 11 is performed.

After address assignment, the notification unit 107A makes a request for virtual path setting in a domain to another point control device 150A2 (Step S68). Then, the notification unit 107A makes a request for address assignment in the domain to the request receiving unit 151, and the intra-administrative domain control unit performs address assignment (setting) in a domain (Step S69). To be specific, the processing in Steps S34 to S36 in the flowchart of FIG. 18 is performed. Note that the processing in Step S69 is performed also when a request for virtual path setting in a domain is received from another point control device 150A2 at the time of receiving a processing request in Step S63.

Further, in Step S63, when the point control device mediation unit 112 receives a request for acquiring information of the inter-administrative domain communication protocol stack list table from another point control device 150A2, the point control device mediation unit 112 extracts the records of the inter-administrative domain communication protocol stack list of its domain from the inter-administrative domain communication protocol stack list table 123 and transmits it to the device from which the request is made (Step S70). Note that, when the point control device mediation unit 112 receives a request for acquiring information of the available address range from another point control device 150A2, the point control device mediation unit 112 extracts the records of the available address range table of its domain from the available address range table 124 and transmits it to the device from which the request is made.

(Operations and Effects of the Integrated Control Device 100 According to the First to Fourth Embodiments)

In the integrated control device 100 described above, to implement communication between a plurality of administrative domains, definition information that defines protocols used in each administrative domain is acquired from the inter-administrative domain communication protocol stack list table 123, and available addresses of each protocol in each administrative domain which can be used for communication between the respective administrative domains are acquired from the available address range table 124. The integrated control device 100 acquires a communication route from a starting point administrative domain to an ending point administrative domain and specifies domains that use each protocol on the communication route by using the definition information. Then, the integrated control device 100 assigns protocol information such as the available address of each protocol between the specified domains by using the available address range table 124 and notifies the assigned address to each domain.

In this case, because protocol layers are defined, and an address that can be used in common to the respective protocol layers on a communication route is determined, it is possible to automatically determine the address that is used between the domains on the communication route.

The definition information that defines a protocol to be inserted to a packet, a protocol to be removed from a packet, or a protocol to be used for transferring a packet in each administrative domain is acquired. In this case, because the domain control device determines an address between domains that are common in the insertion, transfer and removal of a packet, it is possible to automatically determine the address that is used between the domains on the communication route.

Because the integrated control device 100 specifies target domains by using any one or all of definition of a domain to insert protocol information of each protocol acquired from the inter-administrative domain communication protocol stack list table 123 to a packet, definition of a domain to remove the protocol information from a packet and definition of a domain to use the protocol information for transferring a packet, and a communication route, it is possible to reliably specify domains for insertion, transfer and removal.

In the integrated control device 100, available address information is stored in the inter-administrative domain communication protocol stack list table 123. In this case, because the integrated control device 100 stores available addresses in advance and acquires the stored addresses, it is possible to reliably acquire an available address.

In the integrated control device 100, fixed address information is further acquired, and the assignment unit 106 assigns an address by further using the fixed address information. In this case, because the integrated control device 100 acquires the fixed address information and assigns an address based on the fixed address information, it is possible to perform assignment in consideration of a device to which the available range is already fixed.

In the integrated control device 100, the assignment unit 106 eliminates an assigned address from available addresses. In this case, because the integrated control device 100 eliminates an assigned address from available addresses, it is possible to prevent assignment of an address that has been already assigned.

The point control device mediation unit 112 and the available address extraction unit 104A that serve as an available address acquisition means transmits any information in an available address information storage (available address table 124A) to an external device, and acquires available address information that is narrowed down based on the transmitted information from the external device (for example, a point control in a lacking domain). In this manner, because available address information that is narrowed down based on the transmitted information is acquired when acquiring available addresses from an external device, it is possible to reduce the communication load with the external device.

REFERENCE SIGNS LIST

11 . . . CPU, 12 . . . RAM, 13 . . . ROM, 14 . . . input device, 15 . . . output device, 16 . . . communication module, 17 . . . auxiliary storage device, 100 . . . integrated control device, 101 . . . terminal request receiving unit, 102 . . . domain route search unit, 103 . . . inter-administrative domain communication protocol stack list extraction unit, 104 . . . available address extraction unit, 105 . . . target domain specifying unit, 106 . . . assignment unit, 107 . . . notification unit, 110 . . . request unit, 111 . . . inter-administrative domain address selection request receiving unit, 112 . . . point control device mediation unit, 120 . . . storage unit, 121 . . . domain connection table, 122 . . . virtual path via-administrative domains sequence list table, 123 . . . inter-administrative domain communication protocol stack list table, 124 . . . available address range table, 125 . . . temporarily selected address table, 126 . . . selected address table, 127 . . . virtual path setting status management table, 150 . . . point control device, 151 . . . request receiving unit, 152 . . . device route search unit, 153 . . . intra-administrative domain communication protocol stack list extraction unit, 154 . . . available address extraction unit, 155 . . . target device specifying unit, 156 . . . assignment unit, 157 . . . setting unit, 170 . . . storage unit

The invention claimed is:

1. A domain control method performed in a domain control device that assigns an address to be used, among a plurality of administrative domains, on a communication route from a starting point administrative domain at a starting point of communication to an ending point administrative domain at an ending point of communication, each administrative domain being a device group composed of one or more devices including a virtual server and each administrative domain controlled by a control device of a network system, where available addresses are set for each protocol used for communication between an administrative domain and another administrative domain, the method comprising:

a first step of specifying the one administrative domain and another administrative domain on the communication route by using information concerning protocols used for communication between the one administrative domain and another administrative domain;

a second step of acquiring, for each protocol of a plurality of protocols, a first set of addresses set in the one administrative domain and a second set of addresses in the another administrative domain specified by the first step; and a third step of assigning an address usable in common to one administrative domain and another administrative domain among the first and second set of addresses acquired by the second step, wherein information concerning protocols used for communication between the one administrative domain and another administrative domain is information defining protocol types from among (i) an insertion protocol which is a protocol whose address is inserted in a corresponding domain, (ii) a removal protocol which is a protocol whose address is deleted in a corresponding domain, and (iii) a transfer protocol which is a protocol which is transferred based on an address in the corresponding domain, and the first step specifies target domains on the communication route on a basis of a protocol type to be provided by the target domains, and the third step assigns an address that is common to the respective protocol type provided by the specified target domains.

2. The domain control method according to claim 1, further comprising:

a fourth step of notifying one administrative domain and another administrative domain of the address assigned by the third step.

3. The domain control method according to claim 1, wherein the first step specifies target domains in a sequence of a communication route on the basis of protocols to specify target domains by using any one or all of definition of a domain to insert protocol information of each protocol in the information concerning protocols to a packet, definition of a domain to remove the protocol information from a packet and definition of a domain to use the protocol information for transferring a packet, and the communication route.

4. The domain control method according to claim 1, wherein the domain control device stores the available addresses, and the second step acquires an available address for one administrative domain and another administrative domain from the stored available addresses.

5. The domain control method according to claim 1, wherein the second step further acquires fixed address information, and the third step assigns an address by further using the fixed address information acquired by the second step.

6. The domain control method according to claim 1, wherein the third step eliminates an assigned address from available addresses.

7. The domain control method according to claim 4, wherein the second step transmits information of the stored available addresses to an external device and acquires available address information narrowed down based on the transmitted information from the external device.

8. A domain control device that assigns an address to be used, among a plurality of administrative domains, on a communication route from a starting point administrative domain at a starting point of communication to an ending point administrative domain at an ending point of communication, each administrative domain being a device group composed of one or more devices including a virtual server and each administrative domain controlled by a control device of a network system, where available addresses are set for each protocol used for communication between an administrative domain and another administrative domain, the domain control device comprising:

processing circuitry configured to specify the one administrative domain and another administrative domain on the communication route by using information concerning protocols used for communication between the one administrative domain and another administrative domain, acquire, for each protocol of a plurality of protocols, a first set of addresses set in the specified one administrative domain and a second set of addresses in the another administrative domain, and assign an address usable in common to one administrative domain and another administrative domain among the first and second set of acquired addresses, wherein information concerning protocols used for communication between the one administrative domain and another administrative domain is information defining protocol types from among (i) an insertion protocol which is a protocol whose address is inserted in a corresponding domain, (ii) a removal protocol which is a protocol whose address is deleted in a corresponding domain, and (iii) a transfer protocol which is a protocol which is transferred based on an address in the corresponding domain, and the processing circuitry specifies target domains on the communication route on a basis of a protocol type to be provided by the target domains, and assigns an address that is common to the respective protocol type provided by the specified target domains.

* * * * *